United States Patent
Gotoh et al.

(10) Patent No.: US 7,570,635 B2
(45) Date of Patent: Aug. 4, 2009

(54) MULTICAST NETWORK UNIT, MULTICAST NETWORK SYSTEM, AND MULTICAST METHOD

(75) Inventors: Tomonori Gotoh, Kawasaki (JP); Katsumi Tanaka, Kawasaki (JP); Kenzo Kobayashi, Kawasaki (JP); Hiroto Shingai, Kawasaki (JP); Noboru Matsubara, Kawasaki (JP); Kazuyoshi Yamauchi, Kawasaki (JP); Yasutaka Umemoto, Yokohama (JP); Kazuyuki Inomoto, Yokohama (JP)

(73) Assignee: Fujitsu Limited, Kawasaki (JP)

( * ) Notice: Subject to any disclaimer, the term of this patent is extended or adjusted under 35 U.S.C. 154(b) by 507 days.

(21) Appl. No.: 10/949,503

(22) Filed: Sep. 24, 2004

(65) Prior Publication Data

US 2005/0190765 A1 Sep. 1, 2005

(30) Foreign Application Priority Data

Feb. 27, 2004 (JP) .............................. 2004-055511

(51) Int. Cl.
    *H04L 12/28* (2006.01)
(52) U.S. Cl. ..................................................... 370/389
(58) Field of Classification Search ........................ None
    See application file for complete search history.

(56) References Cited

U.S. PATENT DOCUMENTS

| | | | |
|---|---|---|---|
| 5,898,669 A * | 4/1999 | Shimony et al. ............ 370/232 |
| 6,853,639 B1 | 2/2005 | Watanuki et al. | |
| 6,907,037 B2 | 6/2005 | Tsuchiya et al. | |
| 6,957,277 B2 * | 10/2005 | Yagyu et al. ................ 709/245 |
| 7,158,514 B2 | 1/2007 | Tsuchiya et al. | |
| 7,400,645 B2 | 7/2008 | Tsuchiya et al. | |
| 7,400,646 B2 | 7/2008 | Tsuchiya et al. | |
| 7,403,520 B2 | 7/2008 | Tsuchiya et al. | |
| 7,403,522 B2 | 7/2008 | Tsuchiya et al. | |
| 7,408,661 B2 | 8/2008 | Hoshino et al. | |
| 2002/0021697 A1 | 2/2002 | Tsuchiya et al. | |

(Continued)

FOREIGN PATENT DOCUMENTS

JP 9-8833 1/1997

(Continued)

OTHER PUBLICATIONS

Notice of Ground of Rejection mailed Nov. 18, 2008, from the corresponding Japanese Application.

*Primary Examiner*—Chirag G Shah
*Assistant Examiner*—Dargaye H Churnet
(74) *Attorney, Agent, or Firm*—Katten Muchin Rosenman LLP

(57) ABSTRACT

A multicast network system is provided with a multicast network unit that delivers data between independent multicast network domains. The multicast network unit includes an extraction part for extracting a multicast delivery destination address from received data, a holder part for holding conversion data where the multicast delivery destination address corresponds to a delivery source address, and a judgment part for judging whether the multicast delivery destination address is held and outputting the result of a judgment. The multicast network unit also includes a filtering part which, when the result of the judgment is holding, converts the multicast delivery source address to an arbitrary delivery destination address and, when it is non-holding, discards the received data. The multicast network unit further includes a transmitter part for transmitting data containing the converted multicast address to the domain.

18 Claims, 19 Drawing Sheets

U.S. PATENT DOCUMENTS

| | | | |
|---|---|---|---|
| 2002/0031130 A1 | 3/2002 | Tsuchiya et al. |
| 2002/0090002 A1 | 7/2002 | Tsuchiya et al. |
| 2002/0093960 A1 | 7/2002 | Tsuchiya et al. |
| 2002/0176420 A1 | 11/2002 | Tsuchiya et al. |
| 2002/0181464 A1 | 12/2002 | Tsuchiya et al. |
| 2002/0181465 A1 | 12/2002 | Tsuchiya et al. |
| 2003/0074420 A1 | 4/2003 | Hoshino et al. |
| 2006/0274751 A1 | 12/2006 | Tsuchiya et al. |
| 2007/0156920 A1 | 7/2007 | Hoshino et al. |
| 2008/0275961 A1 | 11/2008 | Hoshino et al. |

FOREIGN PATENT DOCUMENTS

| | | |
|---|---|---|
| JP | 10-063598 | 3/1998 |
| JP | 10-242962 | 9/1998 |
| JP | 10-308758 | 11/1998 |
| JP | 11-298498 | 10/1999 |
| JP | 2000-32049 | 1/2000 |
| JP | 2000-134208 | 5/2000 |
| JP | 2001-77859 | 1/2001 |
| JP | 2001-230774 | 8/2001 |
| JP | 2001-345845 | 12/2001 |
| JP | 2002-009848 | 1/2002 |
| JP | 2002-44130 | 2/2002 |
| JP | 2002-152197 | 5/2002 |
| JP | 2003-289319 | 10/2003 |
| JP | 2003-298602 | 10/2003 |

* cited by examiner

FIG. 3A

MULTICAST ROUTING TABLE

15d

| | DESTINATION ADDRESS | PORT NAME OR THE NEXT ROUTER | REMARKS |
|---|---|---|---|
| 1 | 10.1.1.0/24 | PORT #1 (DIRECT CONNECTION) | WITHIN THE SUBNETWORK OF PORT #1 |
| 2 | 10.1.2.0/24 | PORT #2 (DIRECT CONNECTION) | WITHIN THE SUBNETWORK OF PORT #2 |
| 3 | 10.2.0.0/16 | 10.1.1.1 | ROUTER ADJACENT TO PORT #1 |
| 2 | 10.1.2.0/24 | 10.1.1.1 | ROUTER ADJACENT TO PORT #2 |
| 2 | 10.1.2.0/24 | 10.1.2.1 | ROUTER ADJACENT TO PORT #3 |

FIG. 3B

MANAGEMENT TABLE EXAMPLE FOR RENDEZVOUS POINTS

| | MULTICAST ADDRESS | REMARKS |
|---|---|---|
| 1 | 224.0.0.1/32 | RP WITH RESPECT TO 224.0.0.1 |
| 2 | 224.0.0.2/32 | RP WITH RESPECT TO 224.0.0.2 |
| 3 | 224.0.1.0/24 | RP WITH RESPECT TO 224.0.1.X(0−255) |
| 4 | 224.0.0.0/4 | 224.0.0.0 − 239.255.255.255 (ALL MULTICAST ADDRESSES) |

FIG. 4A

BOOTSTRAP MESSAGE (MESSAGE TO BE DELIVERED FROM A BOOTSTRAP ROUTER

TO THE ENTIRE NETWORK THROUGH AN ADJACENT ROUTER)

| 0 | 3 4 | 7 8 | 15 16 | 31 |
|---|---|---|---|---|
| PIM Ver | Type | Reserved | Checksum | |
| Fragment Tag | | | Hash Mask Len | BSR-Priority |
| Encoded-Unicast-BSR-Address | | | | |
| Encoded-Group Address (1) | | | | |
| RP-Count (1) | | Frag RP-Cnt (1) | Reserved | |
| Encoded-Unicast-RP-Address (1) | | | | |
| RP1-Holdtime | | | RP1-Priority | Reserved |
| Encoded-Unicast-RP-Address (2) | | | | |
| RP2-Holdtime | | | RP2-Priority | Reserved |
| . . . | | | | |
| Encoded-Unicast-RP-Address (m) | | | | |
| RPm-Holdtime | | | RPm-Priority | Reserved |
| Encoded-Group Address (2) | | | | |
| . . . | | | | |
| Encoded-Group Address (n) | | | | |
| RP-Count (n) | | Frag RP-Cnt (1) | Reserved | |
| Encoded-Unicast-RP-Address (1) | | | | |
| RP1-Holdtime | | | RP1-Priority | Reserved |
| Encoded-Unicast-RP-Address (2) | | | | |
| RP2-Holdtime | | | RP2-Priority | Reserved |
| . . . | | | | |
| Encoded-Unicast-RP-Address (m) | | | | |
| RPm-Holdtime | | | RPm-Priority | Reserved |

FIG. 4B

INFORMATION TO BE UNICAST FROM A RENDEZVOUS POINT

TO A BOOTSTRAP ROUTER

| 0 | 3 4 | 7 8 | 15 16 | 31 |
|---|---|---|---|---|
| PIM Ver | Type | Reserved | Checksum | |
| Prefix-Cnt | | Priority | Holdtime | |
| Encoded-Unicast-RP Address | | | | |
| Encoded-Group Address (1) | | | | |
| . . . | | | | |
| Encoded-Group Address (2) | | | | |

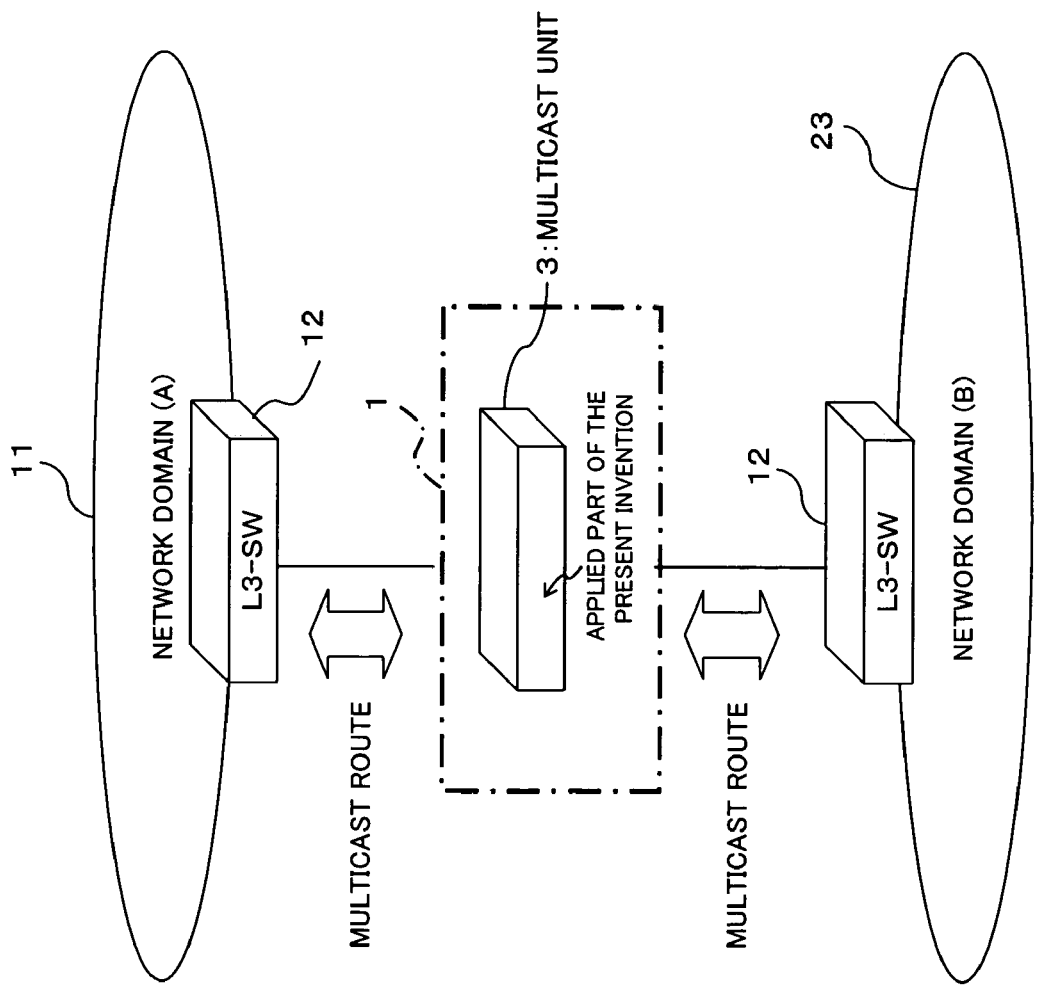

FIG. 7

| ITEM | REQUEST DESTINATION ADDRESS INFORMATION | | DELIVERY DESTINATION ADDRESS INFORMATION | | | PRIORITY | REMARKS |
|---|---|---|---|---|---|---|---|
| | PORT NUMBER | MULTICAST ADDRESS | DELIVERY SOURCE ADDRESS | PORT NUMBER | MULTICAST ADDRESS | DELIVERY SOURCE ADDRESS | | |
| 1 | 1 | 224.0.0.1 | 10.10.10.1 | 2 | 224.0.1.1 | 10.10.20.1 | A | CONVERSION OF A MULTICAST ADDRESS AND A DELIVERY SOURCE ADDRESS |
| 2 | 1 | 224.0.0.2 | 10.10.10.2 | 2 | 224.0.0.2 | 10.10.20.1 | A | CONVERSION OF ONLY A DELIVERY SOURCE ADDRESS |
| 3 | 1 | 224.0.0.3 | 10.10.10.3 | 2 | 224.0.1.3 | ——— | A | CONVERSION OF ONLY A MULTICAST ADDRESS |
| 4 | 1 | 224.0.0.4 | 10.10.10.4 | 3 | 224.0.2.1 | 10.10.10.1 | B | TRANSFER FROM PORT #1 TO PORT #3 |
| 5 | 2 | 224.0.1.1 | ——— | 1 | 224.0.10.1 | 10.10.10.2 | A | WHEN A DELIVERY SOURCE ADDRESS IN DATA-TRANSFERRED INFORMATION IS NOT MADE A CONDITION |
| 6 | 3 | 224.0.2.XXX | ——— | 2 | 224.0.20.XXX | 10.10.10.1 | C | WHEN MULTICAST ADDRESSES ARE REGISTERED IN A MASKED SET |
| 7 | 1 | 224.0.2.1 | ——— | 2 | 224.30.1 | ——— | A | WHEN THERE IS NO CONVERSION OF A DELIVERY SOURCE ADDRESS AND THE CONVERSION IS NOT MADE A CONDITION |

MULTICAST NETWORK UNIT, MULTICAST NETWORK SYSTEM, AND MULTICAST METHOD

BACKGROUND OF THE INVENTION

1. Field of the Invention

The present invention relates to a multicast network unit (a multicast network apparatus), a multicast network system, and a multicast method, which are suitable for systems that deliver voice, video, and data services.

2. Description of the Related Art

In recent years, with the spread of the Internet and speedup of communication lines, delivery service is being widely performed which multicasts IP packets containing content data (such as voice, still images, motion images, etc.) across a network to a great number of delivery destination servers (access servers) that are accessed by users. In the multicast communication, one delivery source server assigns a multicast address having a group identification function to each group (which has a plurality of servers as members).

Multicast protocols will be described.

Typical multicast protocols are several kinds of multicast routing protocols such as DVMRP (Distance Vector Multicast Routing Protocol), PIM (Protocol Independent Multicast)-DM, PIM-SM (Sparse Mode), etc. Among the protocols, PIM-SM suitable for large-scale networks is often employed. Particularly, the case of constructing one multicast network (multicast domain) by the bootstrap routers (BSRs) in PIMv2 will be described with reference to FIGS. 17A and 17B.

(i) Determination of a Rendezvous Point (RP)

FIGS. 17A and 17B show how routing is carried out by PIM-SM. If a delivery destination server 200 shown in FIG. 17A transmits a data delivery request to a router 201a, the router 201a transmits the data request to a rendezvous point (RP) 202 corresponding to the multicast address. A source server 203 delivers data to the RP 202. This rendezvous point 202 represents a delivery point, and a plurality of rendezvous points are provided for each content data such as an image 1, an image 2, etc.

(ii) Bootstrap Router and Rendezvous Point 202

A bootstrap router receives packets from a plurality of rendezvous points 202, within its managing ability and learns delivery information held in each rendezvous point 202. The bootstrap router also sends the learned delivery information and the determined RP information to other routers.

Delivery systems employing multicast communication will hereinafter be described.

(i) Delivery System Having a Single Domain (Network Domain or Multicast Network Domain)

FIG. 18 shows the construction of a delivery system employing a single domain. The delivery system (multicast network system) shown in the figure is, for example, a system that delivers image data. The delivery system has, for instance, seven networks 11, 22, 23, and 31 to 34. Each of the networks 11 to 34 has one or more layer-3 switches (L3-SWs) 90a to 90e that transfer packets. In addition, encoders 21 for delivering image data and decoders (dedicated devices, personal computers, etc.) are connected to each network through routers.

In these networks 11, 22, 23, and 31 to 34, a multicast protocol operates as one multicast domain, and rendezvous points corresponding to multicast addresses are managed by one bootstrap router.

The layer-3 switches 90a to 90e are routers, which retransmit a transmitted packet at high speed by referring to both the IP address (network layer) of the other server contained in the packet and the data (connecting tree) in which a multicast address and a route correspond to each other. Each of the layer-3 switches 90a to 90e is connected to the personal computer (PC) or workstation (WS) of a user through a layer-2 switch (not shown) provided in each communication subnetwork. The layer-2 switch is a bridge, which retransmits a transmitted packet by referring to the MAC address (data link layer) of the other server contained in the packet.

In this way, a route that becomes a rendezvous point is determined for each image source, and if each layer-3 switch receives a data delivery request from a delivery request source, it transmits the data delivery request for image data to the rendezvous point. Similarly, when another L-3 switch receives the delivery request for that image source from another delivery request source, it transmits the data delivery request to the rendezvous point. If there is a route along which the image has been delivered, the layer-3 switch uses a tree construction containing that route. Therefore, since multicast packets are transferred onto only the required route, a reduction in traffic can be decreased.

(ii) Delivery System Having a Plurality of Domains

FIG. 19 shows the construction of a delivery system to which a plurality of domains are connected. In the delivery system shown in the figure, three networks 11, 22, and 23 differing in domain are interconnected through an external network 101, etc. Between the networks 11, 22, and 23, peer-to-peer communication is performed.

Conventional Multicast techniques that have been proposed are disclosed in the following publications.

A gateway device disclosed in e.g. Patent Document 1 relays multicast packets only during the time the packets are being delivered. This allows only the required multicast packets to pass through this device without having influence on other applications or servers, so multicast packets are safely relayed.

In a multicast method disclosed in e.g. Patent Document 2, a public data packet uses a public multicast address and is multicast through a public data packet network. Therefore, network resources (bandwidth capacity) are efficiently used.

In a packet conversion method disclosed in e.g. Patent Document 3, packet conversion devices, provided at the inlet and outlet of a network that supports no multicast communication, convert a multicast packet to a unicast packet to perform communication. This makes multicast communication possible between two kinds of local area networks constituting a virtual public network.

In a multicast method disclosed in e.g. Patent Document 4, when a satellite line is normal, multicast packets are prevented from being sent and received to and from the Internet. Also, when the satellite line is not normal, multicast packets are allowed to be sent and received to and from the Internet. Therefore, a large-scale multicast process becomes possible by employing an IGMP (Internet Group Management Protocol) proxy server.

In a multicast method disclosed in e.g. Patent Document 5, a router proxy server judges if multicast data is delivered from an upper network to a lower network, in dependence on a predetermined criterion, and a network controller delivers multicast data in dependence on the judgment. Therefore, the utilization efficiency of networks is enhanced.

A network unit disclosed in e.g. Patent Document 6 is provided with a conversion data table, in which a multicast address, a unicast address of a terminal, and a port number of a network unit corresponding to a multicast frame and connected with the terminal correspond to one another. Therefore, even when a network unit not corresponding to a multicast frame is used, data can be delivered only to the terminals of a specific group. As a result, the bandwidth utilization efficiency of a network is enhanced, reliability can be improved.

In a multicast communication method disclosed in e.g. Patent Document 7, a sending host sends a message having a group identifier to receiving hosts that have requested that message, at the same time. This permits a message to be transmitted to many receiving hosts at the same time. In addition, a message can be simultaneously transmitted on a very large scale that cannot be realized by one multicast server.

In a multicast gateway communication method disclosed in e.g. Patent Document 8, a multicast gateway receives a message from a sending host, copies that message, and individually sends it to a plurality of receiving hosts as an IP unicast datagram. And the multicast gateway converts the received message, which contains an IP multicast address as a destination, to a message having a group identifier. The converted message is individually sent as an IP unicast datagram to a plurality of receiving hosts that have requested that message.

Therefore, a message can be transmitted simultaneously to receiving hosts that have not supported IP multicast communication.

A communications device disclosed in e.g. Patent Document 9 transfers multicast data between networks by employing an IP multicast address given to a receiving terminal, etc. This makes a network address conversion process unnecessary and also makes high-speed transfer possible at low cost. In addition, a considerable simplification in device construction and a reduction in cost become possible.

In a multicast transfer system disclosed in e.g. Patent Document 10, a multicast node arranged in an ATM network makes a multicast transfer tree where edge nodes are destination nodes, for each user connected to each edge node and dynamically changes that multicast transfer tree in dependence on a control message. Therefore, this system is capable of reducing the load of each relay node and easily coping with node change.

Patent Document 1
Japanese Laid-Open Patent Publication No. 2000-32049
Patent Document 2
Japanese Laid-Open Patent Publication No. 2001-77859
Patent Document 3
Japanese Laid-Open Patent Publication No. 2001-230774
Patent Document 4
Japanese Laid-Open Patent Publication No. 2002-9848
Patent Document 5
Japanese Laid-Open Patent Publication No. 2002-152197
Patent Document 6
Japanese Laid-Open Patent Publication No. 2003-298602
Patent Document 7
Japanese Laid-Open Patent Publication No. HEI 10-63598
Patent Document 8
Japanese Laid-Open Patent Publication No. HEI 10-242962
Patent Document 9
Japanese Laid-Open Patent Publication No. HEI 10-308758
Patent Document 10
Japanese Laid-Open Patent Publication No. HEI 11-298498

However, if the scale of a network employing a multicast protocol is enlarged, a bootstrap router has to process a load that exceeds its managing ability, because the device has a limit to its managing ability. In addition, the number of rendezvous points representing a delivery point is increased. Because of this, bootstrap routers will exceed various kinds of processing abilities. Furthermore, the size of the management table for bootstrap routers is increased, so that traffic congestion occurs.

In multicast networks employing peer-to-peer connection, domains between different networks are connected with one another. On the other hand, the multicast domains 22, 23 and external network 102 are able to refer to the address information (such as multicast addresses, delivery-point (rendezvous-point) information, and multicast source information) within the domains, so there is a problem that security cannot be enhanced.

SUMMARY OF THE INVENTION

The present invention has been made in view of the above-described circumstances. Accordingly, it is the primary object of the present invention to provide a multicast network unit, a multicast network system, and a multicast method which are capable of preventing traffic congestion, maintaining stable data delivery capable of following an enlargement in network scale, and further enhancing security of multicast address information, in a delivery system where a plurality of independent domains are connected.

To achieve this end, there is provided a multicast network unit that delivers data between a plurality of independent multicast network domains. The multicast network unit includes an extraction part for extracting first group address information within a first multicast network domain of the plurality of independent multicast network domains from received data; a holder part for holding the first group address information and second address information within a second multicast network domain of the plurality of independent multicast network domains so that the first group address information and the second address information correspond to each other; and a judgment part for judging whether the holder part holds the first group address information extracted by the extraction part and outputting the result of a judgment. The multicast network unit also includes a filtering part which, when the result of judgment is holding, converts the first group address information to the second address information in the holder part corresponding to the first group address information and, when the result of judgment is nonholding, discards the received data. The multicast network unit further includes a transmitter part for transmitting data containing the second address information converted by the filtering part, to the second multicast network domain.

With the above-described construction, one multicast network can be divided into a plurality of multicast networks, and bootstrap routers can be independently operated. Data delivery requests in both directions between a plurality of independent domains can be delivered or discarded by converting its multicast address or delivery source address (IP address of a transmitting terminal). Therefore, at a delivery destination domain, reference cannot be made to the multicast address of a delivery source domain, delivery point information, and address information such as multicast source information. Thus, security can be maintained and efficient transfer becomes possible.

In accordance with the present invention, there is provided a second multicast network unit that delivers data between a plurality of independent multicast network domains. The second multicast network unit includes an extraction part for extracting delivery destination group address information and delivery source address information from received data; a holder part for holding conversion data where the delivery destination group address information and the delivery source address information correspond to each other; and a judgment part for judging whether the holder part holds the delivery destination group address information extracted by the extraction part and outputting the result of a judgment. The second multicast network unit also includes a filtering part which, when the result of the judgment in the judgment part is holding, converts the delivery source address information to delivery source address information in the holder part corresponding to the delivery destination group address information and, when the result of judgment is non-holding, discards the received data. The second multicast network unit further includes a transmitter part for transmitting data containing the delivery source address information converted by the filtering part, to a delivery destination domain of the plurality of independent multicast network domains.

With the above-described construction, a main cause of non-allowance such as non-acceptance is transmitted to a delivery destination (=request source) domain or delivery destination (=request source) server. Therefore, the delivery destination server does not need retransmit a data delivery message. Because an unnecessary message is not transmitted to a network, unnecessary data processing at each network node is avoided.

In accordance with the present invention, there is provided a multicast network system that delivers data between a plurality of independent multicast network domains. The multicast network system includes a multicast network unit, which is used for delivering the data between a delivery destination domain and a delivery source domain of the plurality of independent multicast network domains. The multicast network unit is made up of (1) an extraction part for extracting delivery destination group address information within the delivery source domain from received data, (2) a holder part for holding conversion data where the delivery destination group address information corresponds to delivery source address information within the delivery source domain, (3) a judgment part for judging whether the holder part holds the delivery destination group address information extracted by the extraction part and outputting the result of a judgment, (4) a filtering part which, when the result of the judgment in the judgment part is holding, converts the delivery destination group address information to the delivery source address information in the holder part corresponding to the delivery destination group address information and, when the result of judgment is non-holding, discards the received data, and (5) a transmitter part for transmitting data containing the delivery source address information converted by the filtering part, to the delivery source domain.

With the above-described construction, even in a large-scale network domain, a multicast network domain (range of management) is divided and bootstrap routers (BSRs) are installed in each of the divided domains. Therefore, even when the scale of a network is enlarged, traffic congestion is avoided without increasing the size of the management table.

In accordance with the present invention, there is provided a multicast method of delivering data between a plurality of independent multicast network domains. The multicast method includes a step of extracting delivery destination group address information and delivery source address information from received data; a step of holding conversion data where the delivery destination group address information and the delivery source address information correspond to each other; and a step of judging whether the conversion data holds the delivery destination group address information and outputting the result of a judgment. The multicast method also includes a step which, when the result of the judgment is holding, converts the delivery destination group address information to the delivery source address information held so as to correspond to the delivery destination group address information and, when the result of the judgment is non-holding, discards the received data. The multicast method further includes a step of transmitting data containing the delivery source address information converted, to a delivery destination domain of the plurality of independent multicast network domains.

Therefore, by controlling traffic such as voice, video, and data transmitted from other domains, faults due to network traffic can be avoided in connecting networks different in transfer ability.

The filtering part may be constructed so that it converts at least either the delivery destination group address or delivery source address information in dependence on a conversion rule. Therefore, when interconnecting domains of different security policies such as external organizations, the proxy or hiding of address information becomes possible and security is enhanced.

The aforementioned filtering part may be constructed so that it disconnects or processes one or more sessions, which are being selected from the present session as acquired delivery traffic and a plurality of communication sessions, in dependence on a priority held in the holder part and assigned to each session.

The aforementioned holder part may be constructed to hold data transmitting-receiving port identification information and the delivery source address or delivery destination group address information so that the data transmitting-receiving port identification information corresponds to the delivery source address or delivery destination group address information.

The multicast network unit may further include a traffic management part that manages traffic in the delivery source domain or delivery destination domain in dependence on delivery traffic information contained in the received data extracted by the extraction part.

The traffic management part may be constructed so that it controls traffic in dependence on both delivery traffic information contained in a first delivery request and limitation information about the delivery traffic information. The traffic management part may also be constructed so that it disconnects or processes one or more sessions, which are being selected from the present session as acquired delivery traffic and a plurality of communication sessions, in dependence on a priority assigned to each session.

The multicast network unit may further include a notification part for notifying a server transmitting the received data of information about processing of the received data in the filtering part.

The aforementioned transmitter part may be constructed so that it transmits a stream containing information about the result of the judgment.

The multicast network unit may further include a unicast transfer part that unicasts data between the delivery destination domain and the delivery source domain.

The multicast network unit may be constructed so that it delivers the data between the plurality of independent multicast network domains through an external network.

With the above-described construction, a large-scale multicast network is divided into a plurality of domains, so a network can be operated for each domain. As a result, the managing ability of a bootstrap router prescribed by a multicast protocol is considerably improved. In addition, since delay or packet loss is prevented during the delivery of content data, the delivery system of the present invention is significantly enhanced in reliability and performance.

More specifically, the number of sessions managed by a rendezvous point that is a delivery point for multicast communication is proportional to the number of rendezvous points, so if the range of management of a bootstrap router is reduced to 1/10, the number of sessions is reduce to 1/10. Therefore, traffic to be managed is drastically reduced.

In addition, when interconnecting domains of different security policies through an external network or external organization, the proxy or hiding of address information becomes possible and therefore security is further enhanced.

BRIEF DESCRIPTION OF THE DRAWINGS

The present invention will be described in further detail with reference to the accompanying drawings wherein:

FIG. 3A is a diagram showing an example of a multicast routing table constructed in accordance with the first embodiment of the present invention;

FIG. 3B is a diagram showing an example of a table for managing rendezvous points, constructed in accordance with the first embodiment of the present invention;

FIG. 4A is a diagram showing an example of a bootstrap message constructed in accordance with the first embodiment of the present invention;

FIG. 4B is a diagram showing an example of a unicast message constructed in accordance with the first embodiment of the present invention;

FIG. 5 is a diagram used to explain the functions of a multicast network unit constructed in accordance with the first embodiment of the present invention;

FIG. 7 is a diagram showing an example of a conversion data table constructed in accordance with the first embodiment of the present invention;

DESCRIPTION OF THE PREFERRED EMBODIMENTS

Embodiments of the present invention will hereinafter be described in detail with reference to the drawings.

(A) First Embodiment

Figure 1:
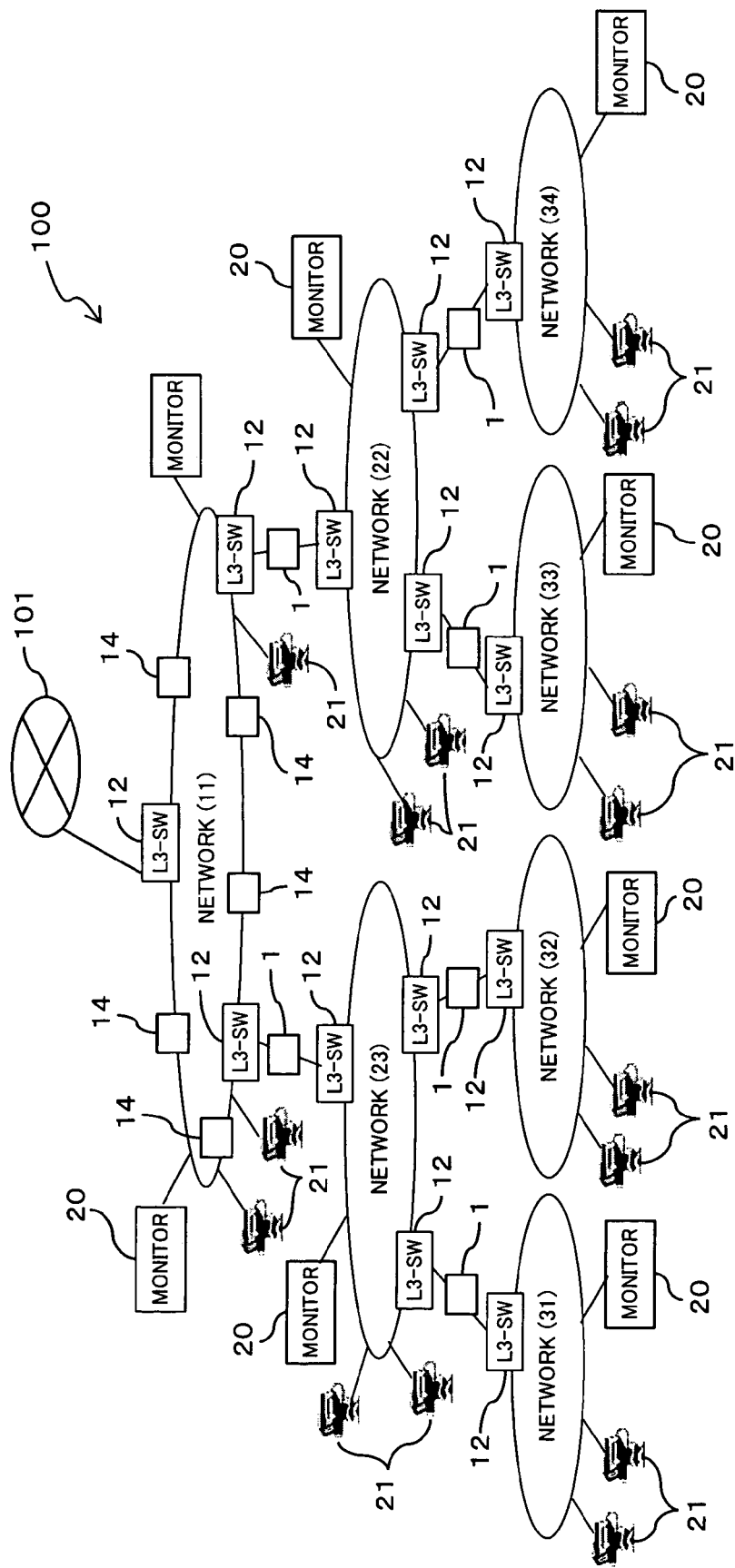
FIG. 1 is a diagram showing the construction of a delivery system to which the present invention is applied.

Referring to FIG. 1, there is shown a delivery system (multicast network system) to which the present invention is applied. The delivery system 100 shown in the figure includes N2 kinds (where N2 is a natural number, for example, 7 kinds) of domains (multicast network domains) 11, 22, 23, and 31 to 34, and multicast network units (of the present invention) 1 provided between the domains 11, 22, 23, and 31 to 34. In the delivery system 100, multicast packets are transmitted and received between the domains 11, 22, 23, and 31 to 34 through the multicast network units 1.

The terms used in the following description will be described.

A request source refers to a delivery destination and a decoder side (special-purpose terminals, PCs, etc.). A request destination also means a delivery source and an encoder side (camera equipment, etc.)

And IP_DA (delivery destination (=transmission destination=destination) is a group address (multicast address). IP_SO (delivery source (=transmission source)) is the IP address of an encoder. A delivery source (transmission source) is the IP address of an encoder terminal. A delivery destination is generally called a multicast address or group address.

(1) Relationship between a Network and a Domain

Reference numerals 11, 22, 23, and 31 to 34 denote one or a plurality of networks constructed, for example, in an enterprise, a government office, a division, etc., and also denote domains (which are logic network identification information). The delivery system 100 is a large-scale network system where the networks 11, 22, 23, and 31 to 34 are connected. The delivery system 100 assigns domains to the networks 11, 22, 23, and 31 to 34, respectively. The networks 11, 22, 23, and 31 to 34 are provided with bootstrap routers, respectively. By managing the networks 11, 22, 23, and 31 to 34 with the bootstrap routers, a network domain to be managed is made smaller.

Figure 19:
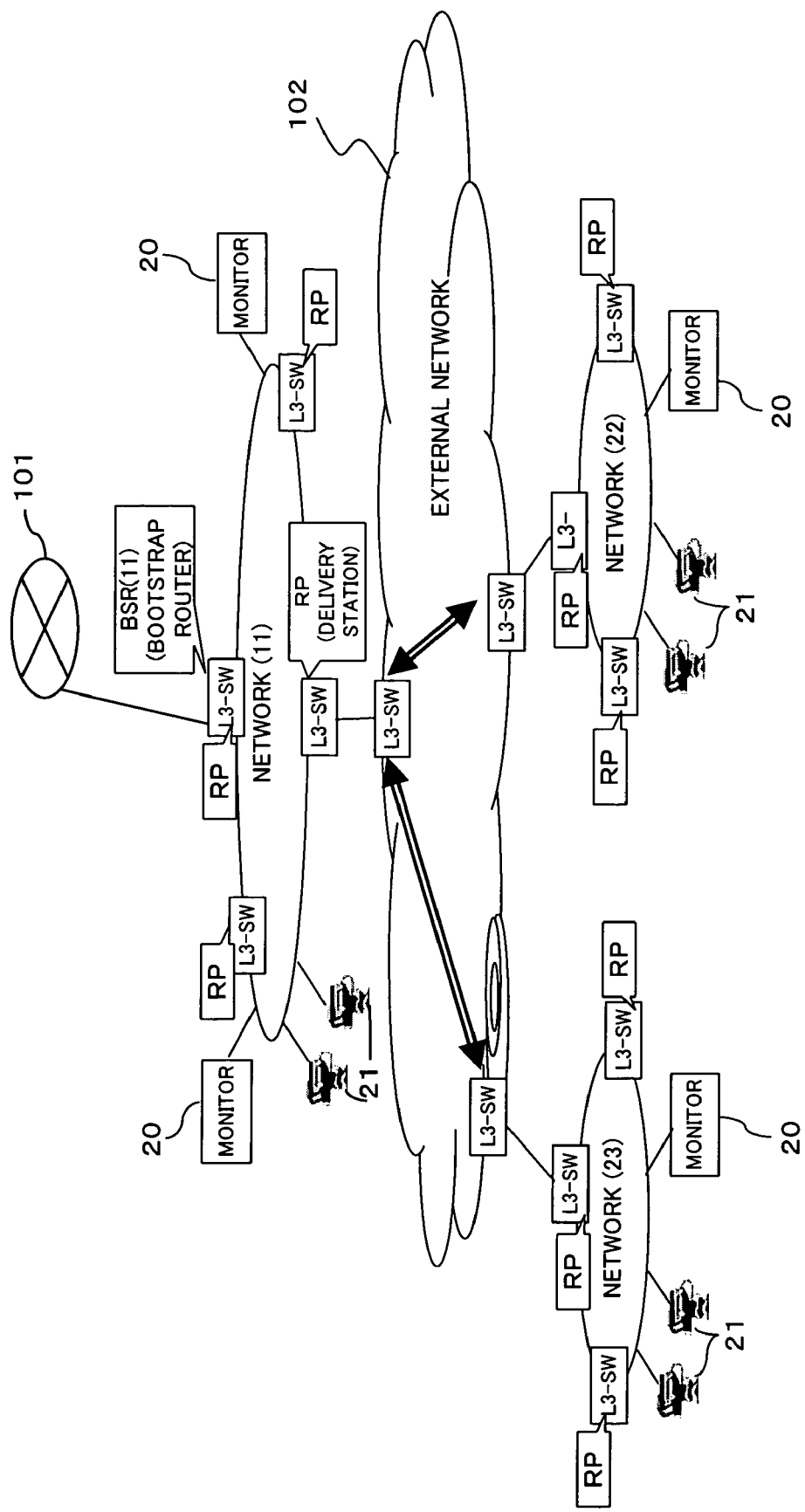
FIG. 19 is a diagram showing the construction of another delivery system to which a plurality of domains are connected.

In the conventional delivery system (FIG. 19), one domain is assigned as a whole to the networks 11, 22, 23, and 31 to 34. On the other hand, the delivery system 100 of the present invention is divided into 7 kinds of domains, which are respectively managed by the bootstrap routers. In the following description, reference numerals 11, 22, 23, and 31 to 34 denote domains unless particularly noted. The domains 11, 22, 23, 31, 32, 33, and 34 differ from one another and are recognized independently of one another.

The multicast network unit 1 of the present invention is provided between two independent domains (e.g., between the domains 11 and 23). In response to a data delivery request from a data request source domain, the multicast network unit 1 checks the multicast address and judges if it is acceptable. If it is acceptable, the multicast network unit 1 sends the data delivery request having the multicast address of the request destination domain converted. On the other hand, if the data delivery request is unacceptable, the multicast network unit 1 discards it. The construction of the multicast network unit 1 will be described with reference to FIG. 6, etc.

In the delivery system 100, bootstrap routers (BSRs) are provided within the independent multicast network domains so data is delivered between the independent multicast network domains.

Unless particularly noted, the multicast network unit 1 is provided between the domains 11 and 23. A description of the multicast network unit 1 provided between the domains other than the domains 11, 23 is omitted in order to avoid redundancy.

(2) Construction of Domains 11 to 34 (11, 22, 23, and 31 to 34)

(2-1) Domains 11 to 34

In the delivery system 100 shown in FIG. 1, a delivery source server delivers content data, such as voice, a still image, a motion image, etc., to delivery destination servers that are accessed by users having a contract with an enterpriser or registered in the enterpriser. The delivery system 100 is a large-scale network where a plurality of networks are connected, and is divided into domains 11 to 34. Each of the domains 11 to 34 is logic network identification information and is one or a plurality of networks constructed, for example, in an enterprise, a government office, a division, etc.

The multicast network unit 1, etc., extract the multicast address contained in a data delivery request and judges if the delivery source is in the same domain or another domain. Even when networks have a different network system or different addressing system, they can be interconnected, and a multicast network across networks is constructed.

The domain 11 shown in FIG. 1 includes monitors 20, encoders 21, access servers 14a, and layer-3 switches (L3-SWs) 12 to 14.

(2-2) Monitor 20, Access Server 14a, and Encoder 21

The monitor 20 is, for example, the display of a PC that receives image data and displays images. The encoder 21 is, for instance, a digital camera or the camera of a portable phone, etc. The access server 14a is a server (or a layer-3 switch) for transmitting and receiving multicast packets. For instance, the monitors 20 and encoders 21 are connected to the domain 11 through the access servers.

With the above-described construction, the image data obtained by processing photographed data with a digital camera is delivered through PCs, access servers, etc. Also, the image data obtained by the camera of a portable phone is delivered through radio stations (not shown) or higher-order packet connecting devices (not shown) than radio stations.

(2-3) Layer-3 Switches 12 to 14

The layer-3 switches 12 to 14 transfer multicast packets at high speed in dependence on group identification information representing a group consisting of host servers of delivery destinations, and also optimize the routes between the delivery destination servers and the delivery source server. In addition, the layer-3 switches 12 to 14 primarily show (i) a function of transferring multicast packets at high speed, based on PIM-SM; (ii) a function of optimizing routes; and (iii) a function as a bootstrap router. Because the layer-3 switches 13 and 14 have the same construction as the layer-3 switch 12, a description of these switches is omitted for avoiding redundancy.

(3) Construction of Layer-3 Switch 12

Figure 2:
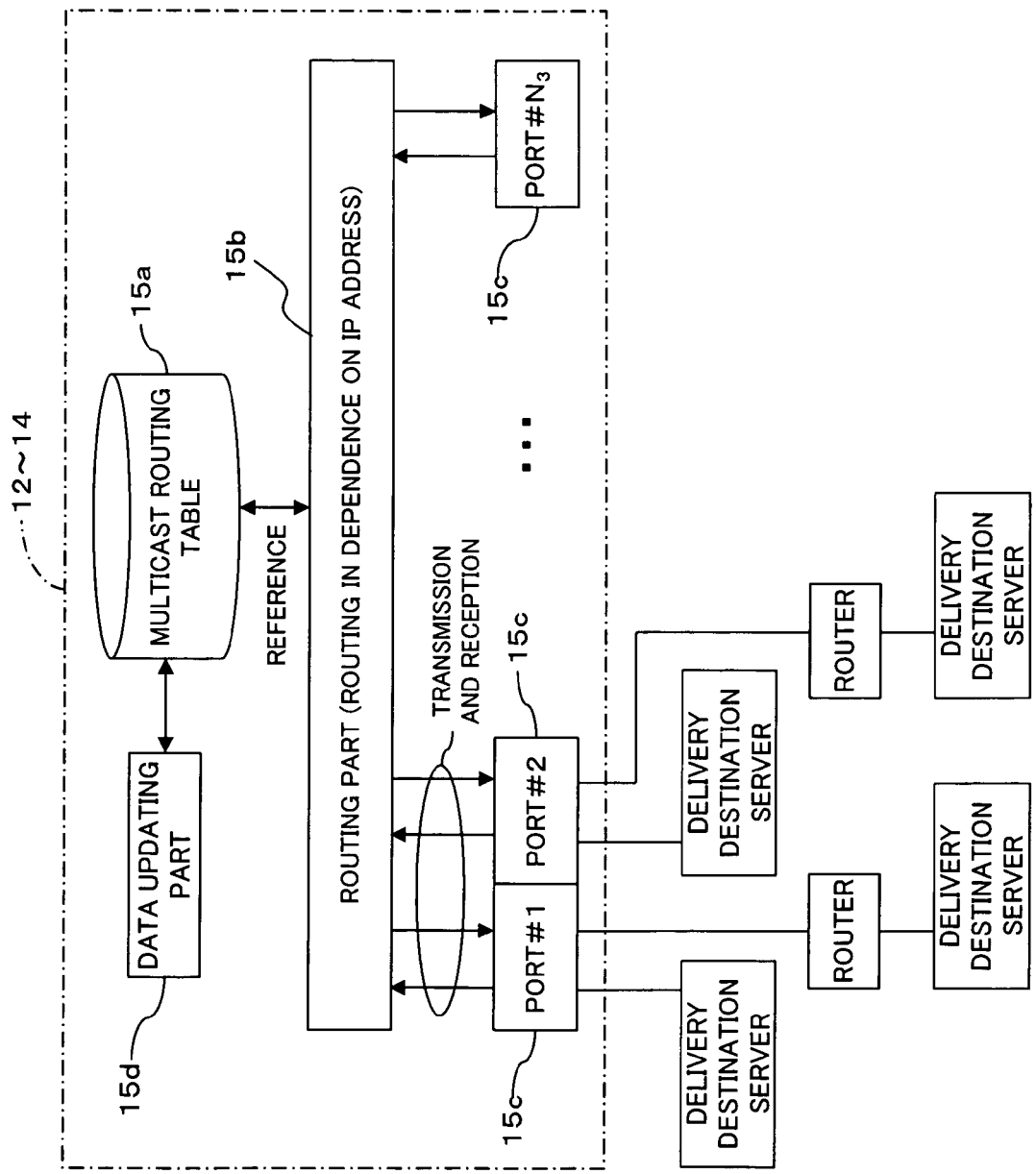
FIG. 2 is a simplified block diagram showing a layer-3 switch constructed in accordance with a first embodiment of the present invention.

FIG. 2 shows the layer-3 switch 12 constructed in accordance with the first embodiment of the present invention. The layer-3 switch 12 shown in the figure is made up of a multicast routing table (a forwarding table or management table) 15a, a routing part 15b, three data transmitting-receiving ports 15c (ports #1 to #$N_3$), and a data updating part 15d. The routing part 15b transfers multicast packets in dependence on both the address of a received packet and the multicast routing table 15a. The data updating part 15d performs the writing and updating of the data in the multicast routing table 15a. The three ports 15c are packet transmitting-receiving ports, which are connected to one or a plurality of delivery destination servers directly or through a router. The delivery destination servers belong to the same group or other groups. The router retransmits packets to the next stage.

The multicast routing table 15a holds updatable data correlating the multicast address (destination address) of a delivery destiantion server with a route (the next router or next server).

(3-1) Multicast Routing Table 15a

FIG. 3A shows an example of the multicast routing table 15a constructed in accordance with the first embodiment of the present invention. The layer-3 switch 12 extracts a multicast address (e.g., 10.1.1.0/24) from a received packet, and transfers the multicast packet to the port (e.g., port #1) connected to a delivery destination server having an address of 10.1.1.0/24 by referring to the multicast routing table 15a.

Note that the multicast routing table 15a employs a routing protocol (e.g., OSPF/RIP, etc.) so that it is automatically updated. The layer-3 switch 12 is able to dynamically change a route, presence or absence of the registration of a delivery destination host server, etc., in dependence on the load on the domain 11.

A method of determining a transfer destination will hereinafter be described in further detail.

A multicast packet with a receiving address of 10.1.1.0/24 or 10.1.2.0/24 is transferred to a router (or a server) within a subnetwork connected directly to the port #1 or #2. A multicast packet with a receiving address of 10.2.0.0/16 and a multicast packet with a receiving address of 10.1.2.0/24 are transferred to the same adjacent router (which has an address of 10.1.1.1). The reason is that the adjacent router belongs to two kinds of groups having addresses 10.2.0.0/16 and 10.1.2.0/24. In addition, the multicast packet with a receiving address of 10.1.2.0/24 is transferred to a router (or a server) within the subnetwork connected directly to the port #2, a router adjacent to the port #1 having an address of 10.1.1.1, and to a router adjacent to the port #2 having an address of 10.1.2.1. The reason is that these three routers are members of the same group.

Therefore, the layer-3 switch 12 is able to manage which port a member of a group assigned a multicast address belongs to, and in this point, it differs from ordinary routers that hold only the corresponding relation between a packet address and a destination router (or a destination port).

The layer-3 switch 12 may be provided with a learning table (not shown) where the history between each port 15c and the address of a packet received from each port 15c is recorded. In this case, the speedup of the packet transferring process is achieved.

(3-2) Route Optimization

A rendezvous point to optimize a route will hereinafter be described.

If the layer-3 switch 12 receives as a rendezvous point the messages sent from a delivery source server and a delivery destination server, the switch 12 generates a temporary route between the two servers and then optimizes the route.

FIG. 3B shows an example of a table for managing rendezvous points, constructed in accordance with the first embodiment of the present invention. The management table shown in the figure shows how the layer-3 switch 12 is to operate as a rendezvous point. For a specific multicast address of 224.0.1/32, the layer-3 switch 12 operates as a rendezvous point for a multicast address of 224.0.0.1. Also, for a multicast address of 224.0.1/24, the layer-3 switch 12 operates as a rendezvous point for all multicast addresses of 224.0.1.x (where x is 0 to 225).

(3-3) Function as a Bootstrap Router

The function as a bootstrap router will hereinafter be described. The function as a bootstrap router is used to determine a rendezvous point.

FIG. 4A shows an example of a bootstrap message constructed in accordance with the first embodiment of the present invention. The bootstrap message shown in the figure has n kinds of Encoded-Group Address fields (where n is a natural number). For each of the n Encoded-Group Address fields, m kinds of Encoded-Unicast-RP-Address fields (where m is a natural number) are stored. This bootstrap message is sent to the layer-3 switch, router, and server of the domain 11 through a router (or a server) adjacent to the layer-3 switch 12 by a bootstrap router. And between the bootstrap router, layer-3 switch, router, and sever, this bootstrap message is transmitted and received, whereby a rendezvous point (RP) is determined. In this way, a bootstrap router within each domain can be arranged and a domain to be managed by the bootstrap router can be made smaller. The numbers 0, 3, 4, . . . , and 31 in FIG. 3A denote the number of bits.

FIG. 4B shows an example of a unicast message constructed in accordance with the first embodiment of the present invention. Between a bootstrap router and a rendezvous point, information is transmitted and received through this unicast message by unicast communication. In this way, the delivery system 100 manages rendezvous points by bootstrap routers.

Note that which layer-3 switch is used as a bootstrap router is determined in dependence on a priority given to each layer-3 switch.

Thus, in the multicast routing table 15a, destination routers are correlated with a group, so efficient transfer becomes possible.

(3-4) Functions of Layer-3 Switches 12 to 14

The functions of the layer-3 switches 12 to 14 shown in FIG. 2 will hereinafter be described in detail.

The layer-3 switch 13 functions as a bootstrap router and is provided at a point connected with an external network 101. This layer-3 switch 13 manages a multicast state by monitoring the transferred state of a multicast packet.

Two layer-3 switches 12 have a route optimizing function and perform multicast communication with the external network 23 of the domain 11 through the multicast network unit 1 of the present invention. Because there are various kinds of contents and they are delivered to many users, a delivery source server sets a group X for a program x and a group Y for a program y, for example. And rendezvous points are provided in dependence on the content of each program, etc. In this way, a route is optimized for each group, so efficient delivery is performed.

The speedup of the packet transferring functions of the layer-3 switches 12 and 13 is performed by employing hardware. The filtering functions are performed by keeping a specific destination server or source server from accessing. In this way, the processing load of the layer-3 switches 12 and 13 can be lightened. Each of the layer-3 switches 12 and 13 determines one kind of route for one kind of multicast address.

And in the domain 11, a delivery source server transmits a multicast packet via a rendezvous point. The rendezvous point then performs unicast communication. In other words, a multicast packet is transferred to a rendezvous point through the shortest route and is further transferred from the rendezvous point to destination servers through another shortest route.

Note that because the domains 22, 23, and 31 to 34 shown in FIG. 1 are approximately the same construction as the above-described domain 11, a description of these domains is omitted for avoiding redundancy.

(4) Multicast Network System 100 of the Present Invention

As set forth above, the delivery system (multicast network system) 100 of the present invention is a system for delivering data between independent domains 11 to 34. And the multicast network unit 1, which delivers data between the source and destination domains 11 and 23 of the 7 (seven) independent domains 11 to 34, includes an extraction part, a holder part, a judgment part, an address converting/filtering part, and a transmitter part.

(5) Multicast Method of the Present Invention

The multicast method of the present invention is a method of delivering data between independent domains 11 to 34. The method includes (1) a step of extracting multicast destination address information representing the delivery destination domain 23 from received data; (2) a step of judging if multicast source address information, which represents the delivery source domain 11 and from which data correlating the multicast destination address information with the multicast source address information is extracted, is held or not; (3) a step which, when the result of the judgment is holding, converts the multicast source address information of the received data to multicast source address information held so as to correspond to the extracted multicast destination information and, when the result of the judgment is non-holding, discards the received data; and (4) a step of transmitting data containing the converted multicast source address information to the delivery source domain 11.

Therefore, if the layer-3 switch 13 of the domain 11 receives a data delivery request from the external network 101 or domains 22 to 34, the layer-3 switch 13 transfers the data delivery request to the layer-3 switch (rendezvous point) of the domain 22 or 23. On the other hand, the delivery source server transfers data to the layer-3 switch 12. The layer-3 switch generates a route temporarily, then transmits data, and optimizes the route. And if the layer-3 switch 12 determines the shortest route, the delivery source server sends image data to many access servers in a stream mode along the shortest route.

Therefore, multicast packets are transferred along only the required route, so the amount of multicast data transferred is suppressed and transfer delay is suppressed. By multiplexing a route in dependence on a connecting tree, route switching can be performed in a short time and recovery time can be shortened, even when a fault occurs.

(6) Multicast Network Unit 1

The multicast network unit 1 according to the first embodiment of the present invention will hereinafter be described in detail.

(6-1) Functions of Multicast Network Unit 1

FIG. 5 is a diagram used to explain the functions of the multicast network unit 1 constructed in accordance with the first embodiment of the present invention. The multicast network unit 1 shown in the figure chiefly has a filtering function of transferring or discarding a multicast packet received; an address conversion function of converting the multicast address of the received multicast packet; and a multicast function of transmitting the address-converted multicast packet. In other words, the multicast network unit 1 is a multicast packet-only fire wall server and is also a proxy server for web multicast packets.

The multicast network unit 1 is connected between two independent domains 11 and 23. If the multicast network unit 1 receives a data delivery request from the domain 11 or 23, the unit 1 delivers the request to the domain 23 or 11 in dependence on the address, or discards the request. Also, as shown in FIG. 1, multicast network units 1 are provided between the domains 11 and 22, between the domains 23 and 31, between the domains 23 and 32, between the domains 22 and 33, and between the domains 22 and 34, respectively. Because the delivery processes between domains other than the domains 11 and 23 are the same as that between the domains 11 and 23, a description of the delivery processes is omitted for avoiding redundancy.

The multicast network unit 1 shown in FIG. 5 is equipped with a multicast unit 3, which transfers a multicast packet between domains (A) and (B). The domains (A) and (B) represent two different domains of the domains 11 to 34.

Thus, the multicast network unit 1 can connect two independent domains in both directions, and can also deliver a data delivery request in both directions or discard it.

In addition, between two independent domains, the multicast network unit 1 checks a multicast address in response to a data delivery request from a data delivery source domain (e.g., domain 23) and judges if that request is acceptable. If it is acceptable, the multicast network unit 1 converts the address of the data delivery request to the multicast address of the data delivery source domain (e.g., domain 11) and transmits the converted data delivery request to the domain 11. On the other hand, when the data delivery request is unacceptable, the multicast network unit 1 discards it. Also, unicast packets between the domains (A) and (B) are discarded by the multicast network unit 1 without passing through the unit 1.

(6-2) Construction of Multicast Network Unit 1

Figure 6:
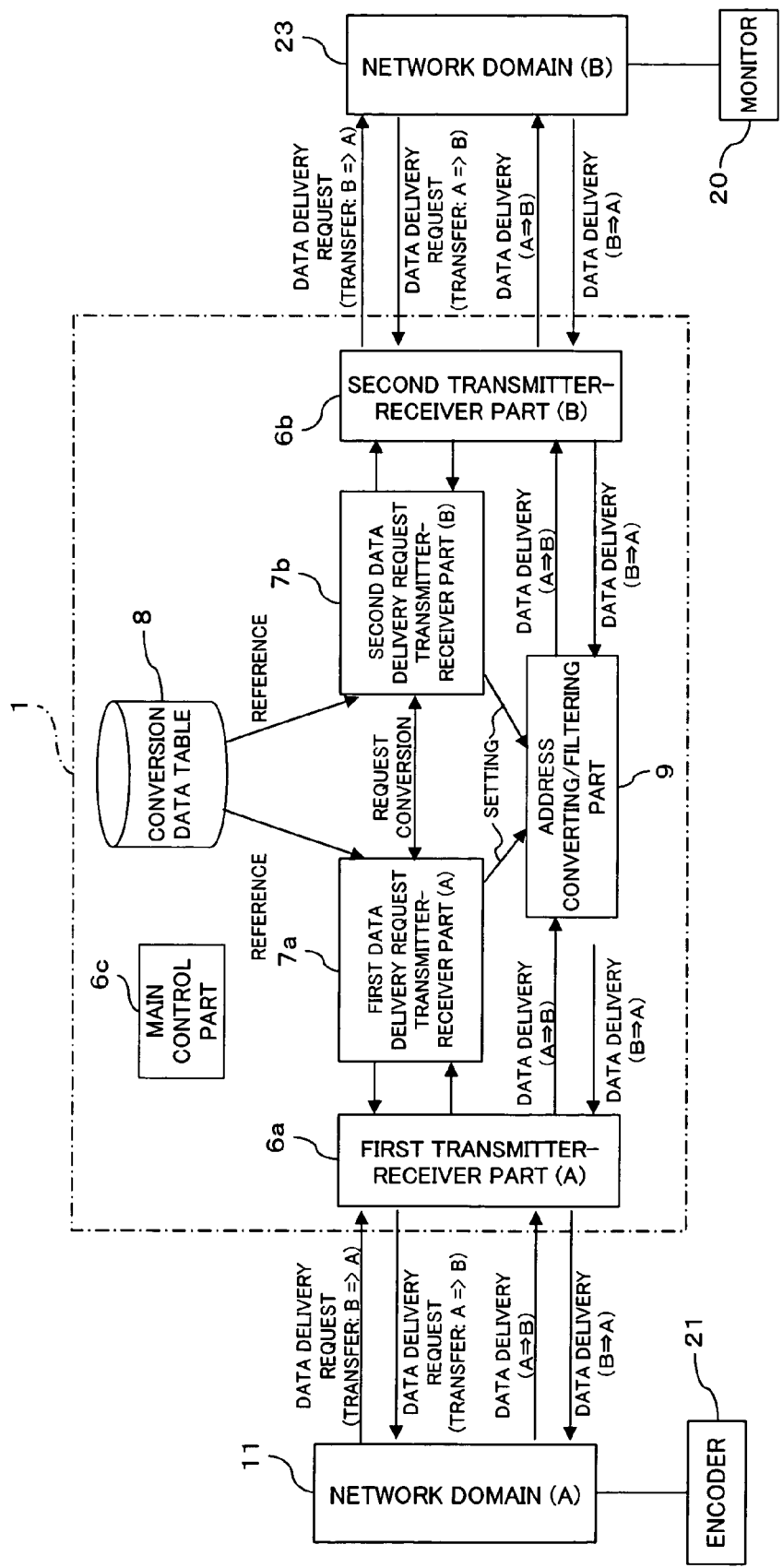
FIG. 6 is a block diagram showing the multicast network unit constructed in accordance with the first embodiment of the present invention.

FIG. 6 shows the multicast network unit 1 constructed in accordance with the first embodiment of the present invention. The multicast network unit 1 shown in the figure is used to deliver data between 7 (seven) independent domains 11, 22, 23, and 31 to 34 and includes a first transmitter-receiver part (first transmitter part) 6a; a second transmitter-receiver part (second transmitter part) 6b; a first data delivery request transmitter-receiver part (first extraction part) 7a; a second data delivery request transmitter-receiver part (second extraction part) 7b; a conversion data table (address conversion table or holder part) 8; an address converting/filtering part {(address converting and filtering part) filtering part} 9; and a main control part (judgment part) 6c.

The first transmitter-receiver part 6a transmits data containing the multicast source address information (second multicast address information) rewritten by the address converting/filtering part 9 to a delivery source domain (second domain), and sends and receives a message (such as a data delivery request and data delivery) to and from the domain (A).

The second transmitter-receiver part 6b transmits data containing the multicast source address information rewritten by the address converting/filtering part 9 to a delivery source domain, and sends and receives a message such as a data delivery request to and from the domain (B). With this arrangement, the content data and control message data, contained in a multicast packet, are delivered and transferred.

The first data delivery request transmitter-receiver part 7a functions as an extraction part, which is used to extract the multicast address information (multicast destination address information) of the first domain (first multicast network domain or delivery destination domain) of 7 (seven) independent domains from received data (received data from the first transmitter-receiver part 6a).

The second data delivery request transmitter-receiver part 7b likewise functions as an extraction part, which is used to extract the multicast address information (multicast source address information) of the second domain (delivery source domain) of the 7 (seven) independent domains from received data (received data from the second transmitter-receiver part 6b). The first data delivery request transmitter-receiver part 7a sends and receives a data delivery request to and from the second transmitter-receiver part 6b. Similarly, the second data delivery request transmitter-receiver part 7b sends and receives a data delivery request to and from the first transmitter-receiver part 6a.

When the judgment part 6c judges the multicast destination address information of the received data to be held, the address converting/filtering part 9 rewrites the multicast destination address information of received data to the multicast source address information. Also, when the judgment part 6c judges that the multicast destination address information of the received data is not held, the address converting/filtering part 9 discards the received data. In dependence on the data held in the conversion data table 8, the address converting/filtering part 9 also performs the address conversion, transfer, and discard of the multicast data sent from the first data delivery request transmitter-receiver part 7a or second data delivery request transmitter-receiver part 7b.

(6-3) Conversion Data Table 8

The conversion data table 8 correlates the first group address information with the multicast destination address information within the second multicast network domain and holds them. More specifically, the conversion data table 8 holds conversion data, which correlates destination domain address information (destination domain information) with the address information of a delivery source server, and conversion rules.

The main control part 6c judges whether the conversion data table 8 holds the multicast destination address information extracted by the first data delivery request transmitter-receiver part 7a, and outputs the result of the judgment. The main control part 6c also controls operation and processing that are to be performed by each part of the multicast network unit 1.

FIG. 7 shows an example of the conversion data table 8 constructed in accordance with the first embodiment of the present invention. The "request destination (delivery source) address information" and "delivery destination address information" of the conversion data table 8 shown in the figure represent information on a multicast packet received by the multicast network unit 1 and information on a multicast packet sent by the multicast network unit 1. Note that the conversion data table 8 has been registered so that the interconnection between a plurality of domains becomes possible.

(6-4) Delivery Source, Delivery Destination, Request Destination, and Request Source The "delivery source" and "delivery destination" are terms used from the standpoint of a data sending side and represent a sender server that transmits content data and a user server that receives content data, respectively. The "request destination" and "request source" are terms used from the standpoint of a data receiving side and represent a sender server that is requested to transmit content data from a receiving side and a user server that requests a sending side to deliver content data, respectively. Unless particularly noted, they will be explained in like meaning.

The conversion data table 8 also correlates the numbers (#1 to #N$_3$) of the ports 15$c$ (transmitting-receiving port identification information) with multicast source address information or multicast destination address information (see FIG. 2) and holds them. For the "request destination address information," the addresses of multicast packets that are received from port number 1 (multicast addresses of a group to which data is delivered) are listed as 224.0.0.1, 224.0.0.2, etc. Also, the addresses of the delivery source servers of the multicast addresses 224.0.0.1 and 224.0.0.2 are listed as 10.10.10.1 and 10.10.10.2. On the other hand, for the "delivery destination address information," the delivery destination groups of the multicast network unit 1 are represented as 224.0.1.1, etc. Also, delivery source server addresses that deliver data to the delivery destination groups 224.0.1.1, etc., are registered as 10.10.20.1, etc.

And when the result of a judgment in the judgment part 6$c$ is holding, the address converting/filtering part 9 converts the multicast destination address of the received data to the multicast source address information of the conversion data table 8 corresponding to that multicast destination address information. When the result of the judgment is non-holding, the address converting/filtering part 9 discards the received data.

(7) Conversion Rules

Address conversion rules (7-1) to (7-7) held in the conversion data table 8 will hereinafter be described in detail.

(7-1) Conversion of Both a Multicast Address and a Delivery Source Address:

If the multicast network unit 1 receives a multicast packet from "request destination address information" (delivery source domain), the unit 1 checks the held data of the conversion data table 8 for the multicast address 230.0.0.1 and judges whether data delivery is possible. When data delivery is possible, the address converting/filtering part 9 converts the multicast address and delivery source address in the "request destination address information" to the multicast address and delivery source address in the "delivery destination address information," respectively and delivers the address-converted data. When data delivery is not possible, the address converting/filtering part 9 discards the received data packet.

The above-described conversion is possible in both directions between domains (A) and (B).

Thus, the address converting/filtering part 9 converts the multicast address and delivery source address contained in the request destination address information to the multicast address and delivery source address contained in the delivery destination address information, respectively.

(7-2) Conversion of Only a Delivery Source Address:

If the multicast network unit 1 receives a multicast packet from "request destination address information," the unit 1 checks the delivery source address 10.10.10.2 and judges whether data delivery is possible. When data delivery is possible, the address converting/filtering part 9 converts the delivery source address 10.10.10.2 to the delivery source address 10.10.20.1 contained in the delivery destination address information and delivers the address-converted data. When data delivery is not possible, the address converting/filtering part 9 discards the received data packet. This conversion rule is applied, for example, in the cases of (E1) to (E3).

(E1) For example, when the delivery source address of a delivery source server is hidden as internal information in order to prevent an invader from accessing, the delivery source address is prevented from leaking from data being transmitted from domain (A) to domain (B).

Therefore, the domain (B) cannot refer to the multicast address, rendezvous point (RP) information, and multicast source information of the domain (A), and security can be maintained.

(E2) By previously registering in the conversion data table 8 the multicast address of a delivery source server that holds voice, video, and data limited in delivery, they are prevented from being delivered.

(E3) If a virtual address is written to the multicast address field, packets can be transferred by multiplexing a protocol.

If a different label from an IP address is attached to the head or end of a packet format to capsulate a packet by employing a different protocol from the protocol of the delivery system 100, each transmitter can also transfer the capsulated packet by referring to only the label of the capsulated packet.

The above-described conversion is also possible in both directions between domains (A) and (B).

Thus, the address converting/filtering part 9 converts the delivery source address contained in the delivery destination address information to the delivery source address contained in the delivery source address information.

(7-3) Conversion of Only a Multicast Address:

If the multicast network unit 1 receives a multicast packet from "request destination address information," the unit 1 checks only the multicast address 224.0.0.3 and judges whether data delivery is possible. When data delivery is possible, the address converting/filtering part 9 converts the multicast address 224.0.0.3 contained in the request destination address information to the multicast address 224.0.1.3 contained in the delivery destination address information and delivers the address-converted data. When data delivery is not possible, the address converting/filtering part 9 discards the received data packet.

More specifically, since there is a possibility that a multicast packet from domain (A) will coincide with a multicast packet in domain (B), in domain (B) the address of either multicast packet is converted in order to avoid a collision of the two multicast packets in domain (B). The conversion in this case is performed in a higher-order layer than a MAC layer.

Thus, the address converting/filtering part 9 converts the multicast address contained in the request destination address information to the multicast address contained in the delivery destination address information. The address converting/filtering part 9 also converts at least either the multicast delivery destination address information or multicast delivery source address information contained in received data in dependence on conversion rules held in the conversion data table 8.

(7-4) Transfer from Port #1 to Port #3:

The multicast network unit 1 checks the multicast address 224.0.0.4 contained in the request destination address information and judges whether data delivery is possible. When data delivery is possible, the address converting/filtering part 9 converts the multicast address 224.0.0.4 to the multicast address 224.0.2.1 of another domain and delivers the address-converted data. When data delivery is not possible, the address converting/filtering part 9 discards the received data packet.

For instance, in the state where three ports 15$c$ of the multicast network unit 1 are connected to three different domains (see FIG. 15 to be described later), a packet received through a first port 15$c$ is transferred to a second or third port 15$c$. In this way, the transfer of a multicast packet between different domains becomes possible.

Thus, the address converting/filtering part 9 transfers received data to a port, assigned delivery destination address information corresponding to delivery destination address information assigned to a port that is receiving the data.

(7-5) When a Delivery Source Address in Data-Transferred Information is not Made a Condition:

Without referring to the delivery source address of the multicast address of a received or data-transferred packet, the multicast network unit 1 writes the multicast address as 224.0.10.1 and writes the delivery source address as 10.10.10.2. Therefore, a delivery source address that is referred to for filtering a multicast packet is not considered and a multicast packet from any domain is caused to have the same multicast address 224.0.10.1 and delivery source address 10.10.10.2 and is transferred to the same multicast group.

Thus, the address converting/filtering part 9 converts the multicast address and delivery source address contained in the delivery destination address information to a specific multicast address and delivery source address.

(7-6) When Multicast Addresses are Registered in a Masked Set:

For instance, the multicast network unit 1 refers to only higher bits of a multicast address without referring to lower bits ("XXX" in the multicast address of FIG. 7 represents "don't care."). Therefore, in many multicast packets, only higher bits are referred to and a great number of multicast packets can be routed.

Thus, the address converting/filtering part 9 transfers received data in dependence on the multicast address in the delivery destination address information which is partially masked.

(7-7) When There is No Conversion of a Delivery Source Address and the Conversion is not Made a Condition:

Since this conversion rule is extended from the method of converting and transferring only a multicast address, described in the aforementioned (7-3), see the transfer source of a multicast packet.

Note that in the conversion data table 8, a method of not converting a delivery source address, a method of converting only a delivery source address, a method of not checking a delivery source address, etc., are possible.

(7-8) Priority:

The conversion data table 8 shown in FIG. 7 assigns a plurality of priorities to conversions rules. Since these priorities are set to stream sessions, vital processing or urgent processing can be first performed. And the address converting/filtering part 9 disconnects or processes one or more sessions, which are being selected from the present session as acquired delivery traffic and a plurality of communication sessions, in dependence on the priority assigned to each session.

When a received multicast packet is processed or discarded, in a conversion rule where multicast packets are discarded after a predetermined number of multicast packets, for example, 10 packets are received, the eleventh multicast packet can be buffered and held.

Thus, the conversion data table 8 holds port numbers connected to each domain, multicast addresses, and delivery source address information, so when interconnecting domains of different security policies such as external organizations, the proxy or hiding of address information becomes possible and therefore security is enhanced.

In addition, the multicast network unit 1 controls traffic in dependence on a priority with respect to a video stream with a vast array of data from another domain, so even when connecting networks of different transferring abilities, faults due to an increase in traffic can be avoided.

Therefore, with respect to a packet from domain (A) containing a data delivery request, at the first transmitter part 6a the data delivery request message is extracted, and at the first data delivery request transmitter-receiver part 7a, reference is made to the address conversion of the conversion data table 8 (FIG. 7) with respect to the address (e.g., 224.0.0.1) of the data delivery request, and address 224.0.1.1 corresponding to address 224.0.0.1 is acquired. At the address converting/filtering part 9, in dependence on the address conversion in the conversion data table 8, the address 224.0.0.1 of the received packet is written to address 224.0.1.1. The address-converted packet is formatted at the second transmitter-receiver part 6b and is transferred to domain (B). When a corresponding address has not been registered in the conversion data table 8, the received packet is discarded so an unnecessary packet is not transferred to networks.

On the other hand, a packet from domain (B) shown in FIG. 6 is likewise transferred to domain (A) independence on the address conversion registered in the conversion data table 8, at the address converting/filtering part 9 through the second transmitter-receiver part 6b and second data delivery request transmitter-receiver part 7b. Also, when a corresponding address has not been registered in the conversion data table 8, the received packet is discarded.

Thus, according to the multicast network unit 1, address-converted transfer of multicast data and discard of an unnecessary packet are performed between two different domains (A) and (B), so efficient transfer becomes possible.

(8) First Modification of Multicast Network Unit 1

As a first medication, the multicast network unit 1 is further able to have a unicast function of transmitting a packet to a single address.

Figure 8:
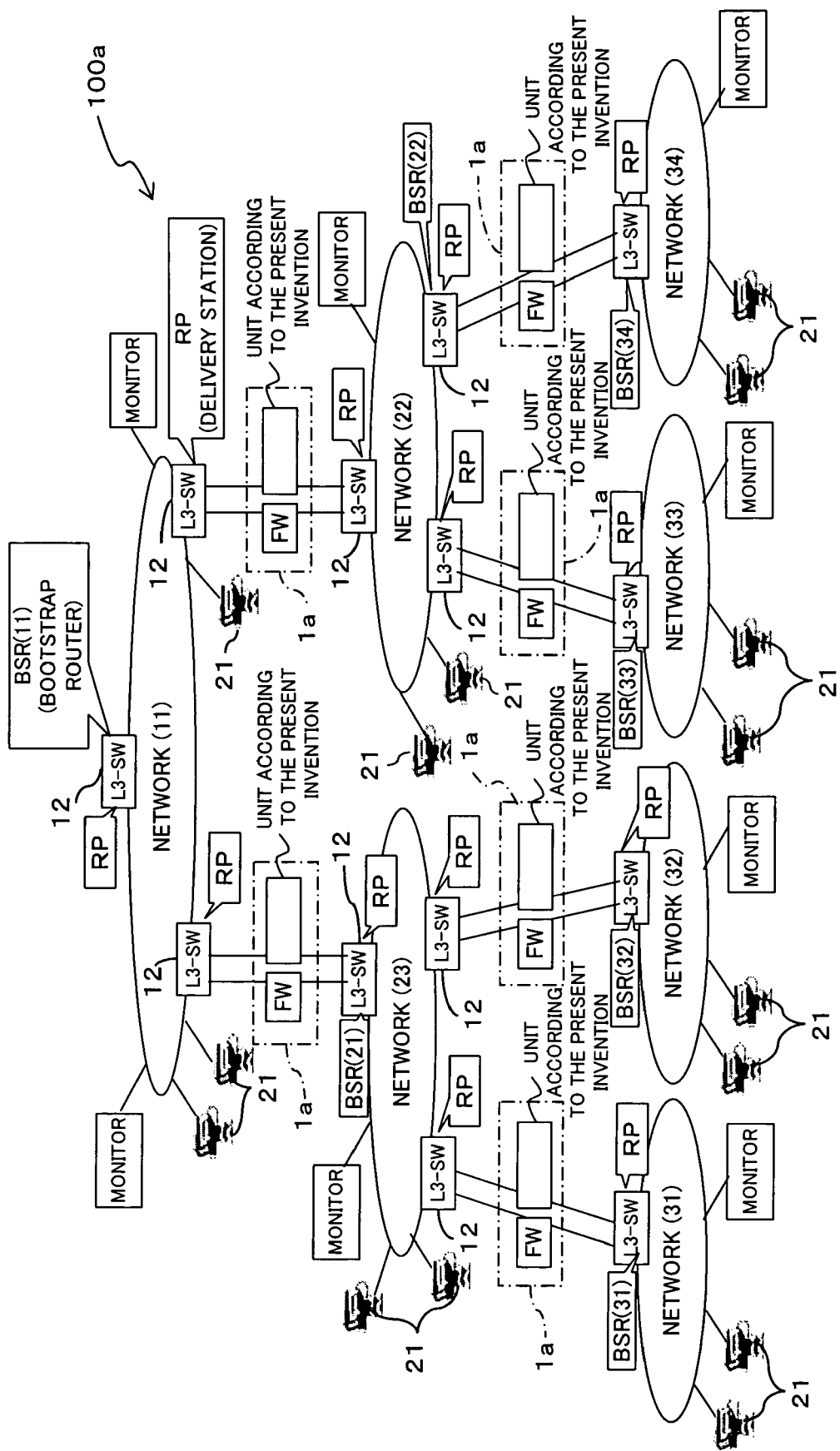
FIG. 8 is a diagram showing a delivery system constructed in accordance with a first modification of the first embodiment of the present invention.

FIG. 8 shows a delivery system 100a constructed in accordance with a first modification of the first embodiment of the present invention. The delivery system 100a shown in the figure performs multicast communication and unicast communication. Between domains, there is provided a multicast network unit 1a. In the delivery system 10a, as with the delivery system (see FIG. 1), a large-scale network with various networks connected thereto is divided into domains 11 to 34. In FIG. 8, the same reference numerals denote the same parts as the first embodiment shown in FIG. 1, so a description of the same parts is omitted for avoiding redundancy.

(9) Second Modification of Multicast Network Unit 1

Figure 9:
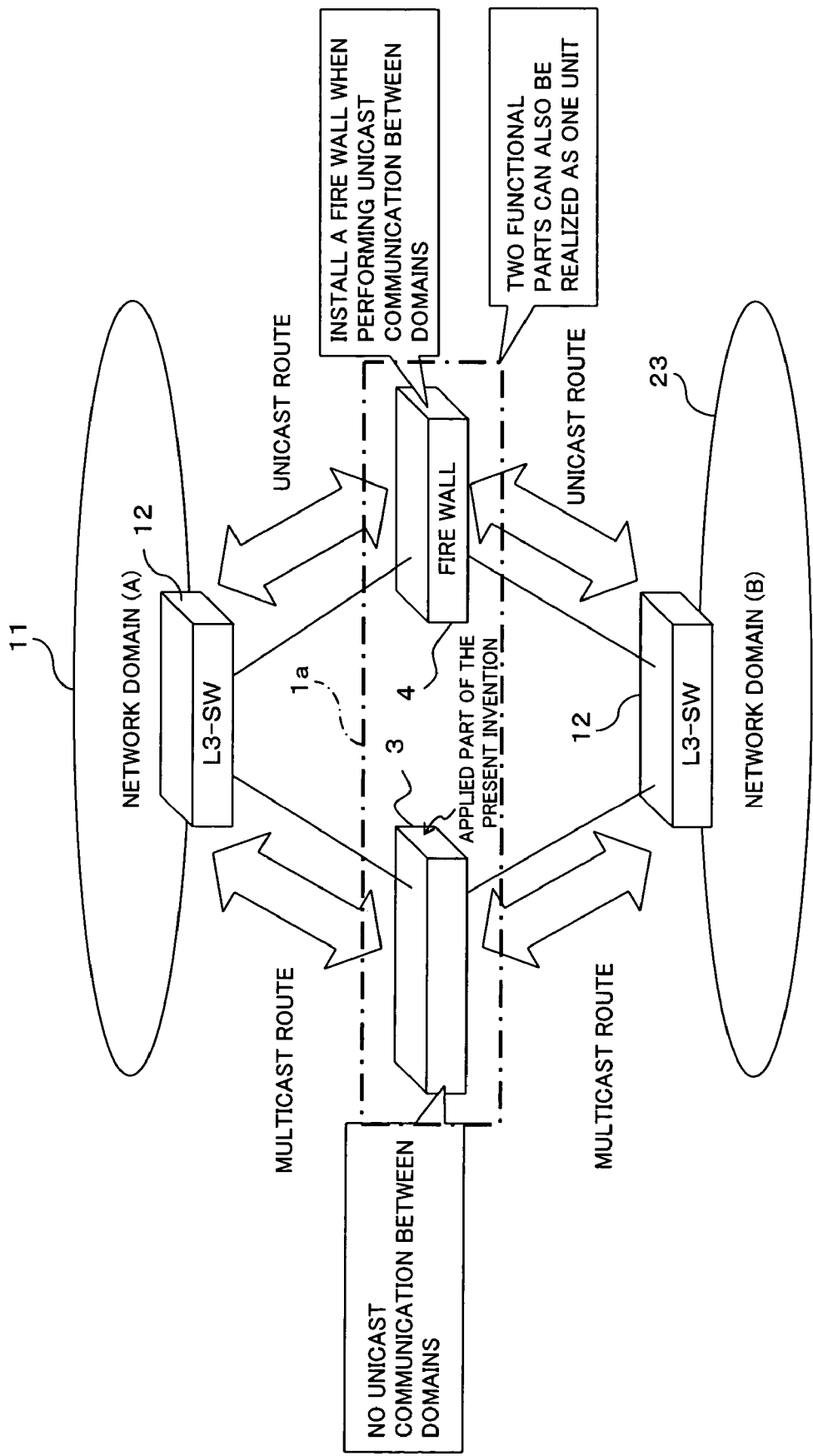
FIG. 9 is a diagram showing a multicast network unit constructed in accordance with a second modification of the first embodiment of the present invention.

FIG. 9 shows a multicast network unit 1a constructed in accordance with a second modification of the first embodiment of the present invention. The multicast network unit 1a shown in the figure further has a fire wall unit (unicast transmitter part) 4 that performs unicast communication between domains (A) and (B). The multicast network unit 1a is constructed so that multicast packets and unicast packets are delivered or discarded.

Therefore, in the multicast network unit 1a, multicast packets are processed by a multicast unit 3, while unicast packets are processed by the fire wall unit 4. The processed multicast packets and unicast packets are transferred between domains (A) and (B).

Therefore, in the case where unicast packets are not processed, the multicast network unit 1a may include only the multicast unit 3. In this case, hardware construction and software processing are both simplified, so the cost of the multicast network unit 1a can be reduced. On the other hand, if some components (e.g., ports) are shared by the multicast unit 3 and fire wall unit 4, the functions of both units can be integrated into one unit.

(10) Operation

Figure 10:
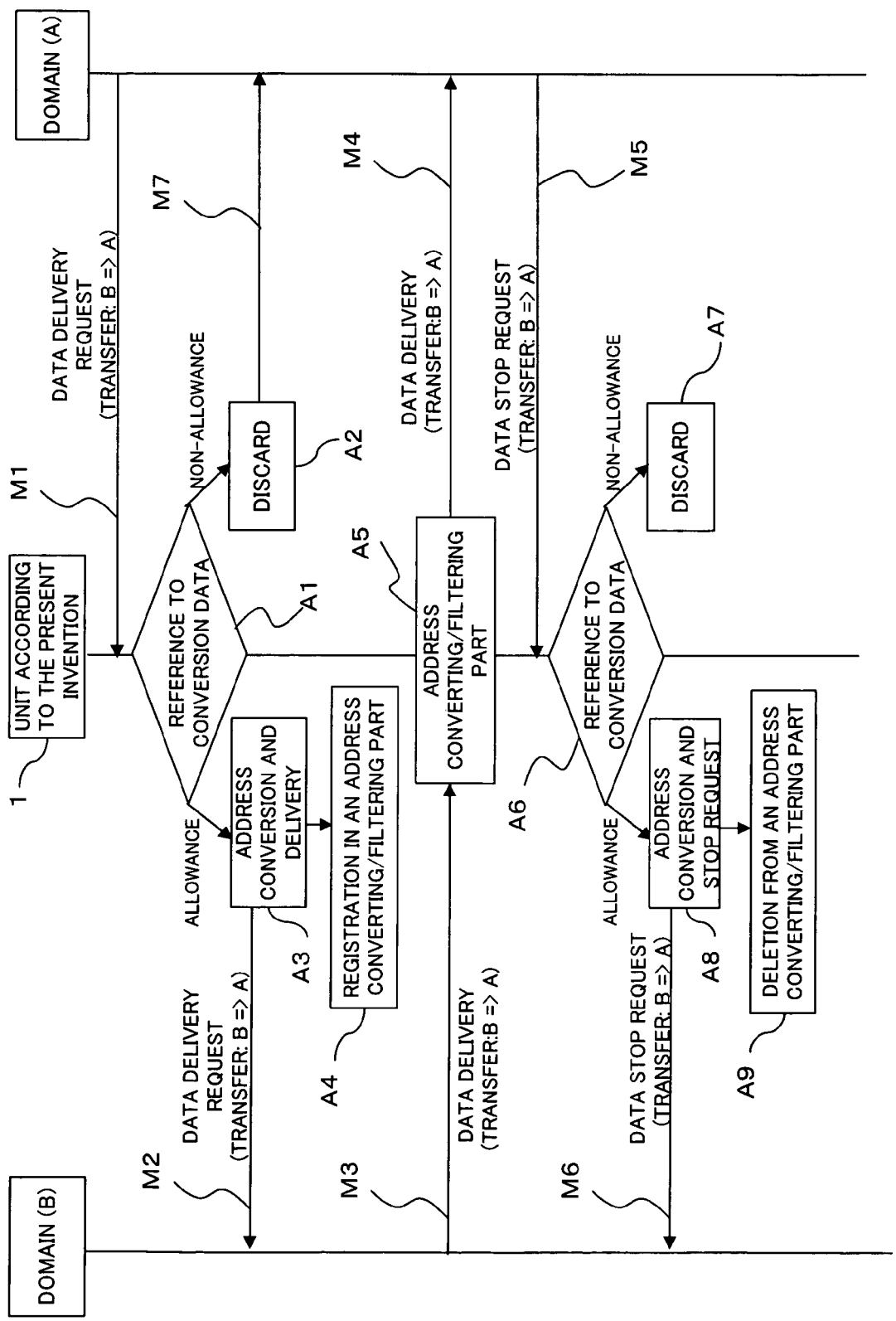
FIG. 10 is a flowchart used to explain operation of the multicast network unit constructed in accordance with the first embodiment of the present invention.

Operation of the multicast network unit 1, constructed in accordance with the first embodiment of the present invention, will hereinafter be described with reference to FIG. 10, which is a flowchart used to explain operation of the multicast network unit 1. A description will be given in the case where content data is delivered or transferred from domain (B) to domain (A) (hereinafter referred to as transfer: B=>A). A server or router belonging to domain (A) sends a data delivery request (transfer: B=>A) to the multicast network unit 1 (message M1). The main control part 6c refers to the conversion data table 8 (FIG. 6) (step A1) and judges whether the multicast address of the data delivery request has been registered. When it has not been registered, the data delivery request passes through a route labeled "Non-Allowance" and is discarded (step A2), and domain (A) is notified of the discard (message M7).

On the other hand, when it has been registered, it passes through a route labeled "Allowance," and the main control part 6c converts the multicast address according to the conversion rule of the conversion data table 8 and transfers the data delivery request containing the converted address (transfer: B=>A) (message M2) to domain (B) (step A3). At the same time, the main control part 6c sets the conversion rule to the address converting/filtering part 9 (step A4).

If the multicast network unit 1 receives multicast data delivery (transfer: B=>A: message M3) from domain (B), the address converting/filtering part 9 converts the address in dependence on the conversion rule (step A5) and transmits the multicast data delivery containing the converted address (transfer: B=>A: message M4) to domain (A). In this way, a delivery destination server in domain (A) acquires data.

When stopping data delivery, operation is performed in the same manner as when data delivery is performed. If the multicast network unit 1 receives a data stop request (transfer: B=>A: message M5) from domain (A), the main control part 6c refers to the conversion data table 8 (step A6). When the request is allowed, the main control part 6c converts the multicast address according to the conversion rule (step A8) and transfers the data stop request containing the converted address (transfer: B=>A: message M6) to domain (B). At the same time, the main control part 6c deletes the conversion rule registered in the address converting/filtering part 9 (step A9).

On the other hand, when the request is not allowed in step A6, the main control part 6c discards the multicast packet (step A7).

Note that the multicast network unit 1a processes multicast packets in the same manner.

Thus, the multicast network units 1 and 1a perform the passage or discard of a multicast packet by checking the multicast address. Therefore, even when the scale of a network is enlarged, the size of the management table is not increased and traffic congestion is avoided.

(11) Third Modification of Multicast Network Unit 1

As a third modification, the multicast network unit 1 can also have a traffic management (session control) function. This traffic means a data quantity. More specifically, it is a data quantity represented by both throughput representing the data quantity of each of the multicast and unicast data that are input and output in and from the multicast network unit 1, and the number of links arranged between domains (A) and (B).

(11-1) Session Control Part 42

Figure 11:
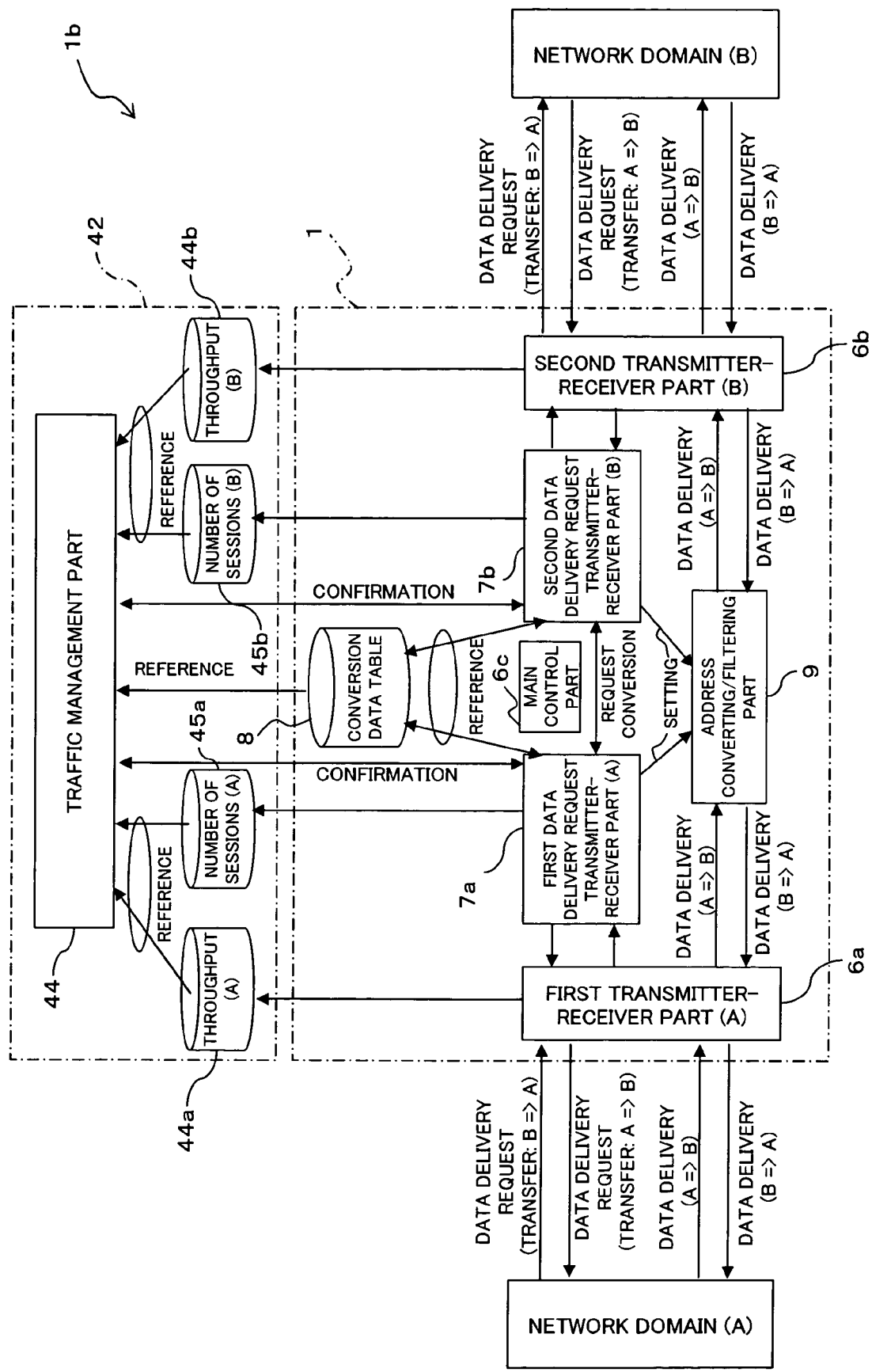
FIG. 11 is a block diagram showing a multicast network unit with a session control function constructed in accordance with the first embodiment of the present invention.

FIG. 11 shows a multicast network unit 1b with a session control function constructed in accordance with the first embodiment of the present invention. The multicast network unit 1b shown in the figure is provided with a session control part 42 that controls sessions, in addition to the functions of the multicast network unit 1. This session control part 42 monitors or measures a traffic value representing load in a network such as a throughput quantity and number of sessions, and controls sessions in dependence on the monitored traffic value. The session control part 42 is constructed so it switches the acceptance and non-acceptance of a data delivery request in dependence on the traffic between domains (A) and (B). The session control part 42 includes throughput monitoring parts 44a and 44b, session-number monitoring parts 45a and 45b, and a traffic management part 44.

The first throughput monitoring part 44a monitors throughput between the domain (A) and the multicast network unit 1b. The second throughput monitoring part 44b similarly monitors throughput between the multicast network unit 1b and the domain (B). For instance, throughput is monitored by monitoring the number of packets transmitted and received at the first transmitter-receiver part 6a and second transmitter-receiver part 6b. The first session number monitoring part 45a monitors the number of sessions between the domain (A) and the multicast network unit 1b. The second session number monitoring part 45b likewise monitors the number of sessions between the multicast network unit 1b and the domain (B). For example, the number of sessions is monitored by monitoring messages extracted at the first transmitter-receiver part 6a and second transmitter-receiver part 6b.

The traffic management part 44 is used to manage traffic in a delivery source domain or delivery destination domain in dependence on traffic information contained in received data extracted at the extraction parts (first transmitter-receiver part 6a and second transmitter-receiver part 6b). The traffic management part 44 controls traffic in dependence on traffic information contained in a first data delivery request and limit information (e.g., the threshold value of the traffic information) about the traffic information, and also determines a processing or non-processing object in dependence on the traffic information and limit information.

And the traffic management part 44 is able to disconnect or process one or more sessions, which are being selected from the present session as acquired delivery traffic and a plurality of communication sessions, in dependence on a priority assigned to each session. In this way, a session that is not disconnected can be assured regardless of traffic size. In FIG. 11, the same reference numerals denote the same parts as the aforementioned embodiment, so a description of the same parts is omitted for avoiding redundancy.

(11-2) Operation of Traffic Management Part 44

With the above-described construction, the session control method of the multicast network unit 1b will hereinafter be described in detail.

The traffic management part 44 manages the throughput and number of sessions in the domains (A) and (B) by sequentially monitoring them. If the data delivery request transmitter-receiver part 7a or 7b receives a data delivery request from domain (A) or (B), it notifies the traffic management part 44 of a confirmation request. In response to the confirmation request, the traffic management part 44 refers to the throughput and number of sessions and compares them with a predetermined traffic limiting value. In this comparison, if the traffic management part 44 judges the throughput and number of sessions to be within a limit, the traffic management part 44 accepts the data delivery request and continues to transfer data. On the other hand, if the traffic management part 44 judges the throughput and number of sessions to have exceeded a limiting capacity, the traffic management part 44 discards the data delivery request.

Note that traffic can be managed by employing either throughput or the number of sessions.

Thus, the multicast network unit 1b has the traffic control function, so if the number of data delivery request messages from a data delivery destination domain reaches a predetermined number of sessions, the multicast network unit 1b stops accepting a session request and therefore can avoid traffic congestion.

According to the traffic control function of the multicast network unit 1b, if the throughput for packets from a data delivery destination reaches a predetermined value, acceptance of a session request is stopped so the throughput does not exceed the predetermined value. Likewise, traffic congestion can be avoided.

(12) Fourth Modification of Multicast Network Unit 1

As a fourth modification, when the multicast network unit 1c of the present invention discards a data delivery request, a server transmitting that data delivery request may be notified of a processing result such as a main cause of non-acceptance, etc.

Figure 12:
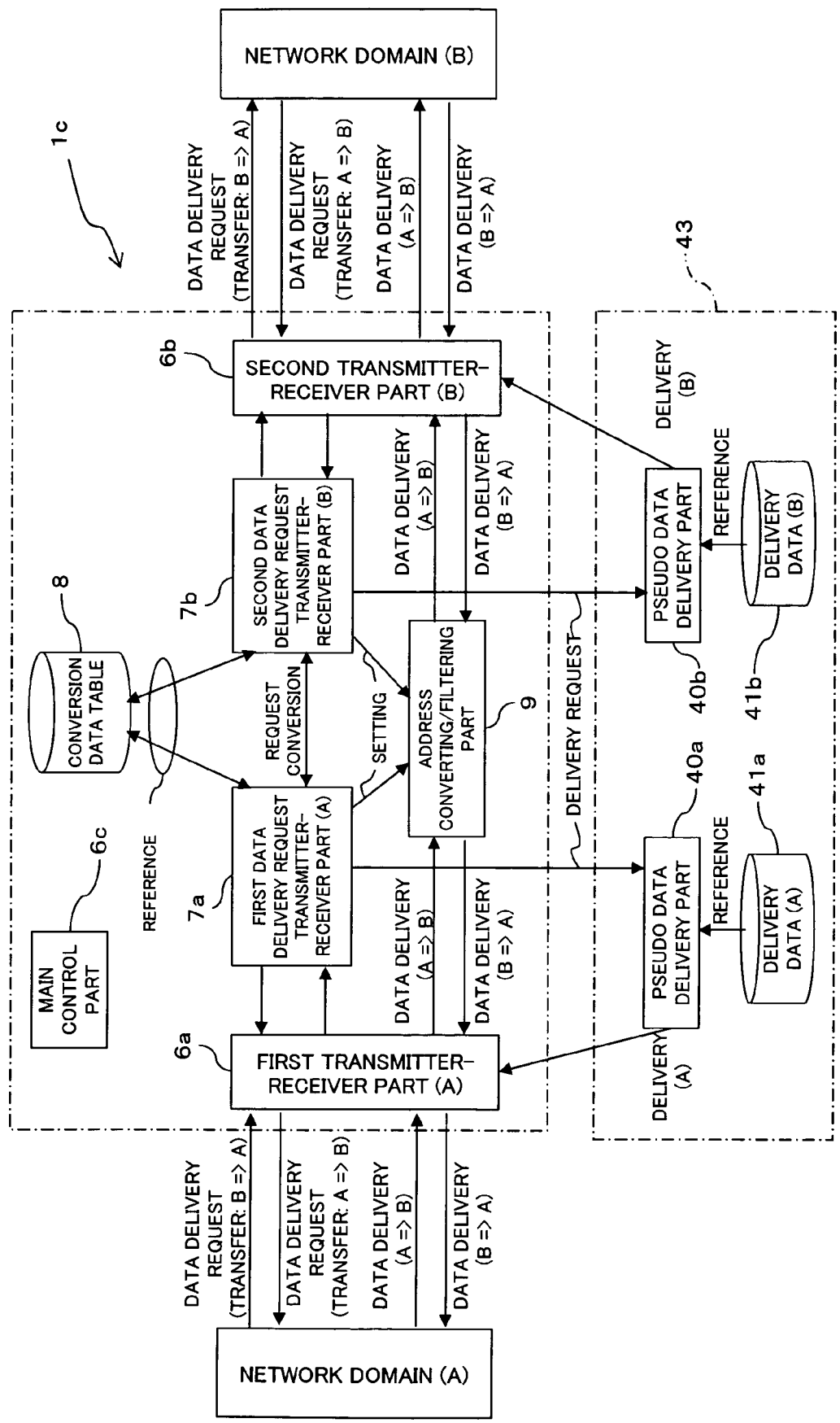
FIG. 12 is a block diagram showing a multicast network unit constructed in accordance with a fourth modification of the first embodiment of the present invention.

FIG. 12 shows the multicast network unit 1c constructed in accordance with a fourth modification of the first embodiment of the present invention. The multicast network unit 1c shown in the figure further has a notification part 43 that notifies a server, which is transmitting data, of information about the data processing in the address converting/filtering part 9, in addition to the functions of the multicast network unit 1. The information about data processing is information about a main cause of discard such as a multicast address not being registered, when the address converting/filtering part 9 discards received data. As information other than a main cause of discard, information about temporary buffering, transferring, etc., of the received data may be notified.

The notification part 43 has a first delivery data holder part 41a, a second delivery data holder part 41b, a first pseudo data delivery part 40a, and a second pseudo data delivery part 40b. The first delivery data holder part 41a and second delivery data holder part 41b are used to hold content data (such as voice, image, etc.) as pseudo multicast sources (multicast source data), respectively. The first pseudo data delivery part 40a is used to output to the first transmitter-receiver part 6a a stream such as a pseudo multicast source held in the first delivery data holder part 41a. Similarly, the second pseudo data delivery part 40b is used to output to the second transmitter-receiver part 6b a stream such as a pseudo multicast source held in the second delivery data holder part 41b.

The first transmitter-receiver part 6a and second transmitter-receiver part 6b further transmit a stream containing information about the result of a judgment. When the result of the judgment is non-acceptance, the multicast network unit 1c transfers, for example, video streams held in the first delivery data holder part 41a and second delivery data holder part 41b instead of transmitting the original multicast data.

Thus, the multicast network unit 1c notifies a delivery source domain or delivery source server of a main cause of non-acceptance, so each delivery destination can known that its delivery request message has not been delivered. Therefore, retransmission of the delivery request message can be prevented. Because unnecessary messages are not transmitted to networks, an unnecessary delivery process at each network node is avoided.

(13) Fifth Modification of the Multicast Network Unit 1

As a fifth modification, the multicast network unit of the present invention can have both the function of managing traffic and the function of notifying about a main cause of non-acceptance.

(13-1) Construction of Multicast Network Unit 1d

Figure 13:
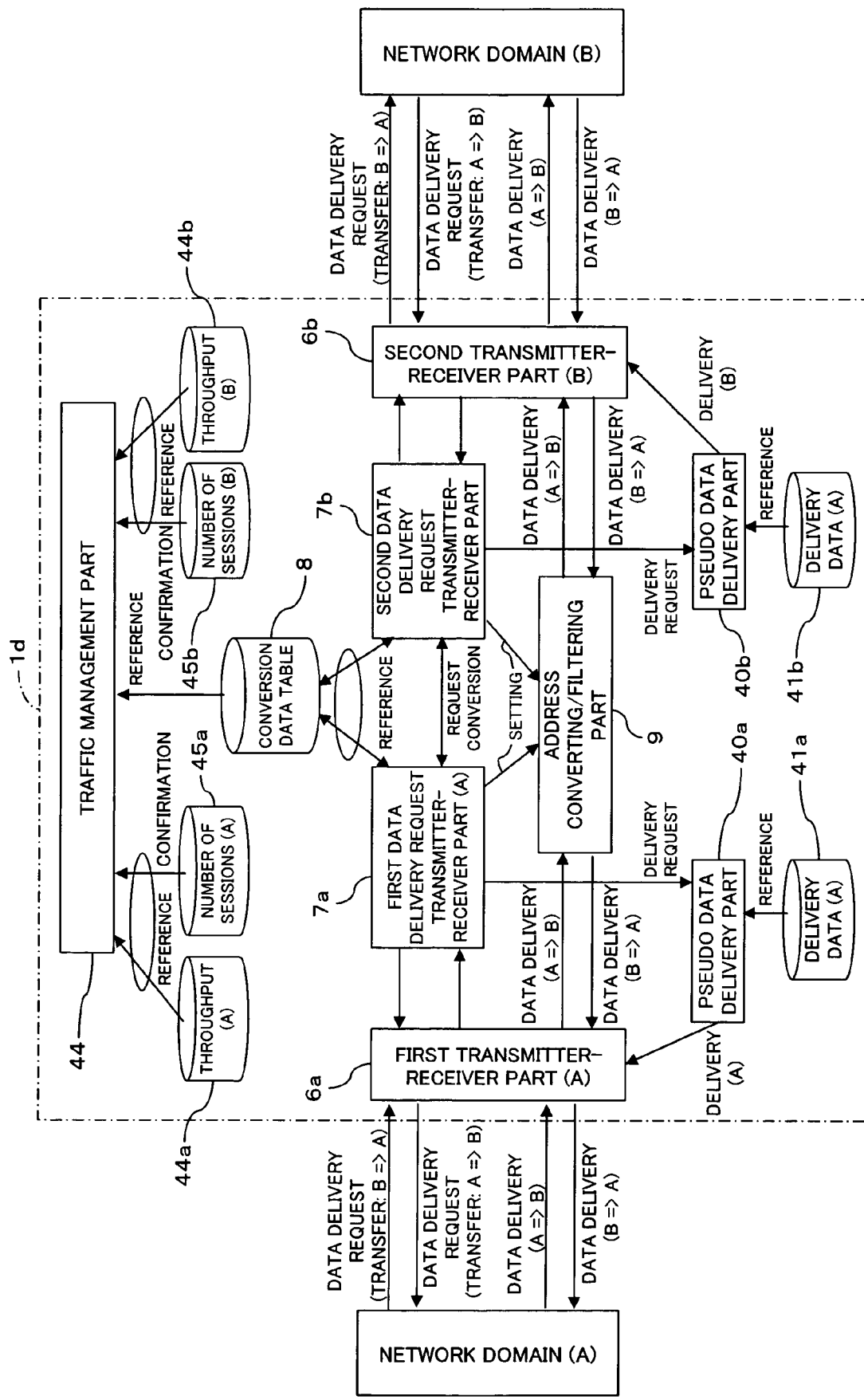
FIG. 13 is a block diagram showing a multicast network unit constructed in accordance with a fifth modification of the first embodiment of the present invention.

FIG. 13 shows a multicast network unit id constructed in accordance with a fifth modification of the first embodiment of the present invention. The multicast network unit 1d shown in the figure has a pseudo data delivery function in addition to the function of the above-described traffic management part 44. When an address contained in a data delivery request has not been registered in the conversion data table 8, or when the traffic management part 44 judges that traffic has exceeded a traffic limiting value and judges that acceptance of a data delivery request is not allowed, the data delivery transmitter-receiver parts 7a and 7b (or the main control part 6c) notify a first pseudo data delivery part 40a and a second pseudo delivery part 40b of the data delivery request and falsely transmits a pseudo multicast source representing non-allowance instead of transmitting the original multicast data.

Therefore, if the multicast network unit 1d judges that the throughput and number of sessions have exceeded predetermined threshold values and judges the data delivery request to be unacceptable, the delivery destination server is notified that acceptance has not been allowed. Therefore, the delivery destination server can receive, for example, a message of non-allowance with respect to the data delivery request message transmitted to a delivery source server. As a result, the delivery destination server can know whether the data delivery request message has been lost on a transmission path, or whether the transmitted message has not been processed in the delivery source server without being received. For that reason, delivery destination servers do not need to transmit the same data delivery request message repeatedly, so that network congestion is suppressed.

(13-2) Operation of Traffic Management Part 44

With the above-described construction, the traffic management part 44 of the multicast network unit id continues to monitor. And if the traffic management part 44 receives a confirmation request with respect to a data delivery request from the domain (A) or domain (B), the traffic management part 44 judges whether throughput and the number of sessions are within a limit. If the traffic management part 44 judges that throughput and the number of sessions have exceeded the limiting capacity, the traffic management part 44 discards the data delivery request and also notifies the first pseudo data delivery part 40a and second pseudo data delivery part 40b of the data delivery request and causes them to falsely transmit a pseudo multicast source representing non-allowance.

In addition, according to the traffic control function of the multicast network unit 1d, if the throughput for packets from a data delivery destination domain exceeds a predetermined threshold value, acceptance of sessions is stopped so the throughput does not exceed the predetermined threshold value.

As set forth above, when a priority is previously set for each session and the number of sessions reaches a predetermined number, the traffic management part 44 can disconnect the present session and switch a processing object from the present session to a session whose priority is higher, if it accepts a session having a higher priority than the priority of the present session. Therefore, for example, a vital session can be maintained or assured and bandwidth can be guaranteed.

Figure 15:
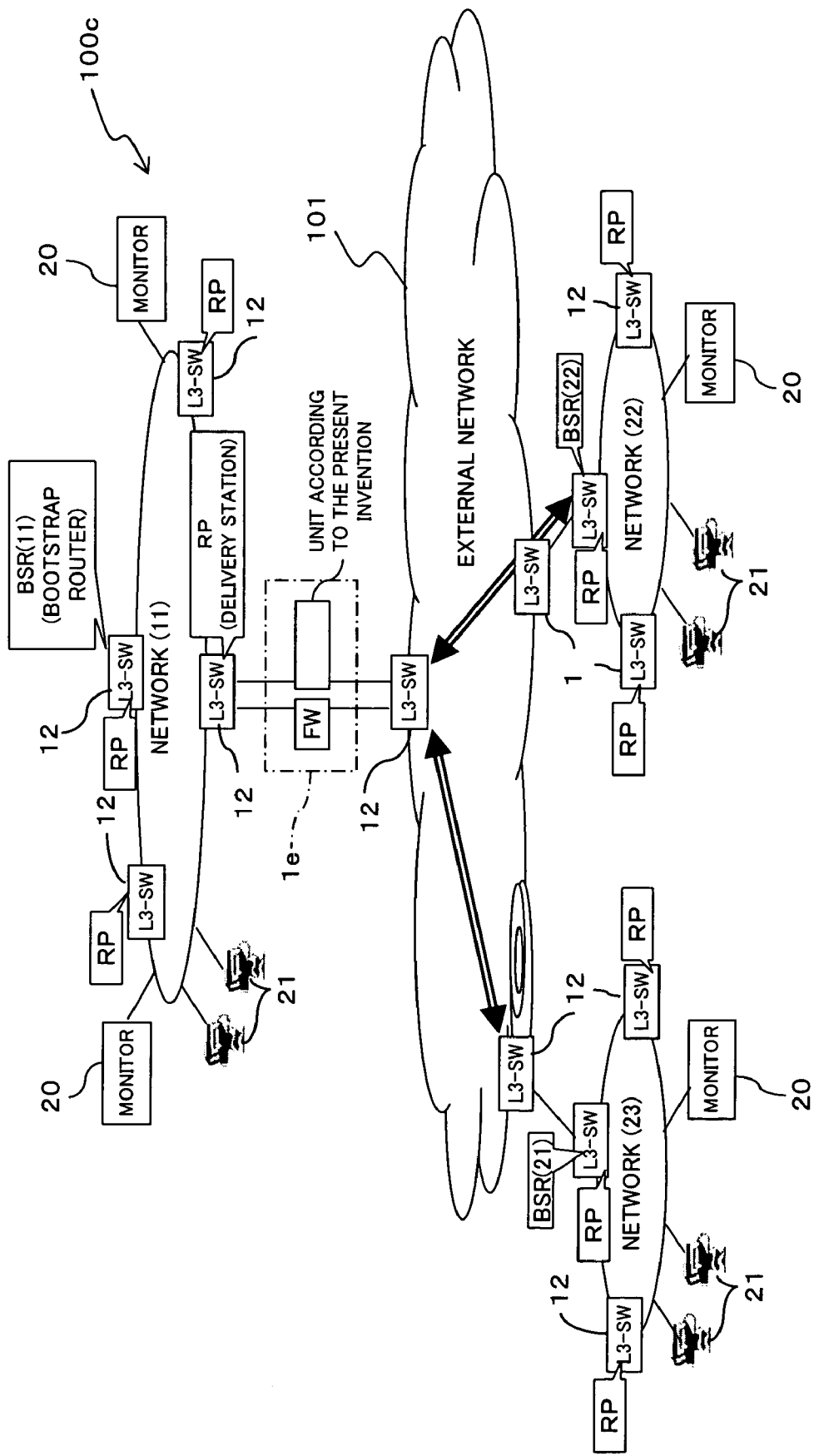
FIG. 15 is a diagram showing a delivery system constructed in accordance with a second embodiment of the present invention.

For instance, as shown in FIG. 15, a delivery system 100 has three difference domains 11, 22, and 23, which are connected through an external network 101. A multicast network unit 1e is provided between the domain 11 and the external network 101. In FIG. 15, the same reference numerals denote the same parts as the aforementioned embodiment, so a description of the same parts is omitted for avoiding redundancy.

(13-3) Session Control Method

With the above-described construction, the session control method of the multicast network unit 1d will be described in detail with reference to FIG. 14.

Figure 14:
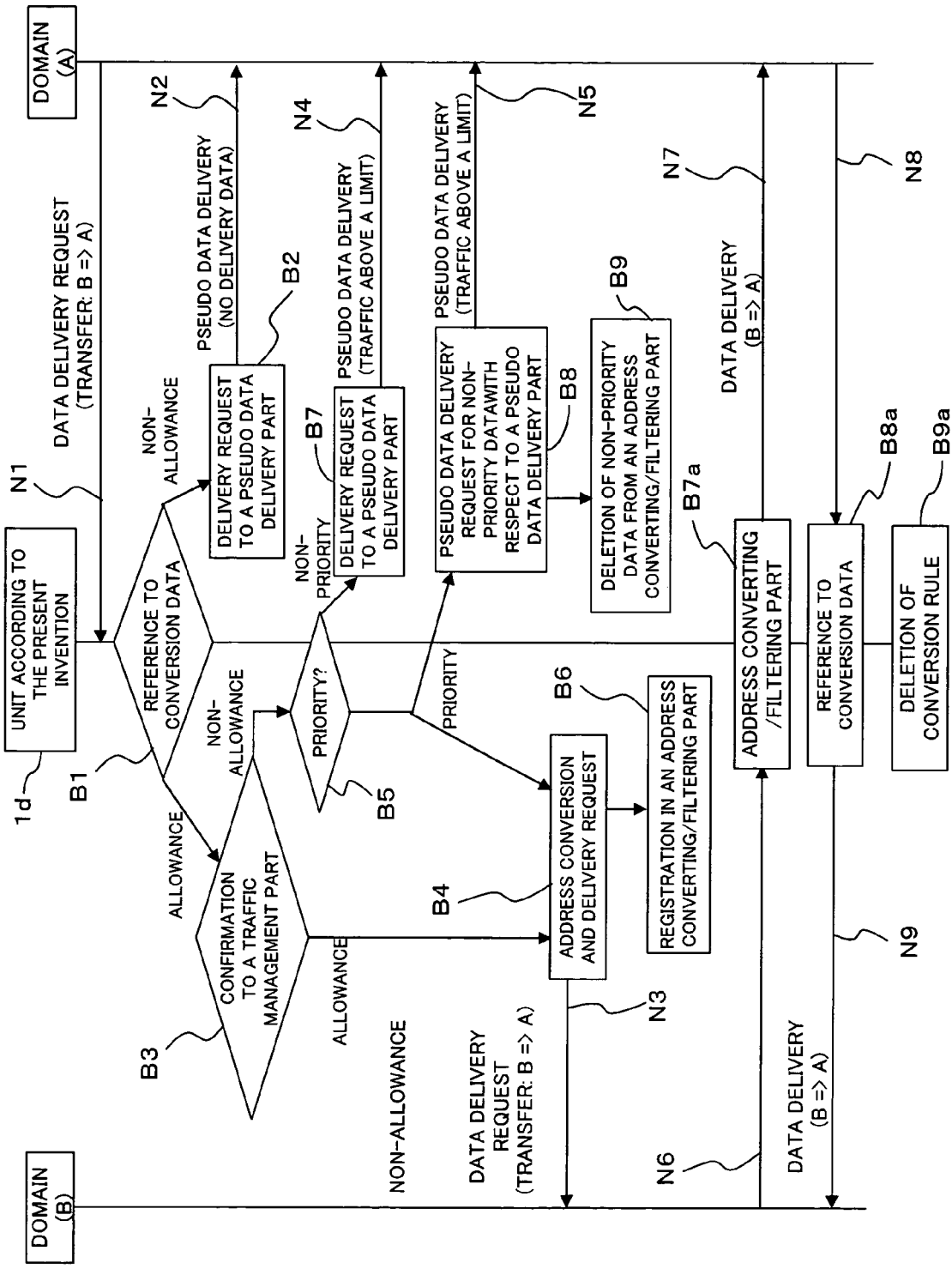
FIG. 14 is a flowchart used to explain a session control method of the first embodiment of the present invention.

FIG. 14 shows the session control method of the first embodiment of the present invention. In the figure, data is delivered from domain (B) to domain (A).

If the multicast network unit 1d receives a data delivery request (message of transfer B=>A) from domain (A) (message N1), the unit 1d makes reference to the conversion data table 8 and judges whether the multicast address of the data delivery request has been registered (step B1). When it has not been registered, the data delivery request passes through a route labeled "Non-Allowance," and the multicast network unit 1d discards the data delivery request as a non-allowance request. Even when it has been registered, the multicast network unit 1d judges the requested address to be a non-allowance address, if the registered address is an address that cannot be delivered. And the multicast network unit 1d transmits the data delivery request to the first pseudo data delivery part 40a of the domain (A) and notifies that it is a non-allowance address (message N2). When it is not-allowance, the multicast network unit 1d outputs the data delivery request to the first pseudo data delivery part 40a (FIG. 13) and informs that it has exceeded a limiting capacity (step B2).

On the other hand, in step B1, when it has been registered, it passes through a route labeled "Allowance," and the multicast network unit 1d converts the multicast address according to the conversion rule of the conversion data table 8, then transfers the data delivery request containing the converted address to domain (B) (step B3), and registers the data delivery request in the address converting/filtering part 9 (step B4). At the same time, the multicast network unit 1d transmits a confirmation request to the traffic management part 44 thereof as an allowed request. In step B5, the priority is judged.

If the priority is low and judged to be non-priority, it passes through a route labeled "Non-Priority," and the main control part 6c requests the pseudo data delivery part to transmit a data delivery request (step B7). The pseudo data delivery part delivers pseudo data to domain (A). This pseudo data may contain words or images, which indicate that traffic is above a limit.

In step B5, when the priority is judged to be high, the main control part 6c requests the pseudo data delivery part to deliver the pseudo data on a non-priority side (message N4). The pseudo data delivery part delivers pseudo data to domain (A). Note that the multicast network unit 1d is also able to transmit to domain (A) a message indicating that traffic is above a limit. In step B8, the main control part 6c also deletes the requested non-priority data from the address converting/filtering part 9 (step B9).

As set forth above, in step B5, when it is non-allowance but has been registered as data whose priority is high, the multicast network unit 1d retrieves for the presence or absence of a session that is lower in priority than a session judged to be non-allowance and is lowest in priority, with respect to the address converting/filtering part 9 presently being set. When there is present a session with the lowest priority, the multicast network unit 1d rewrites the address of a lower-priority session to the multicast address on the side of the domain (B). The multicast network unit 1d also notifies the first pseudo data delivery part 40a of pseudo data delivery.

In step B3, when the present traffic is judged to be within a traffic limiting value and is allowed, and when the present traffic has exceeded the traffic limiting value but is allowed, the multicast network unit 1d continues to transfer data. In step B4, the multicast network unit 1d converts the multicast address in dependence on the conversion rule held in the conversion data table 8 and transmits the data delivery request containing the converted address (transfer of B=>A: message N3) to domain (B). At the same time, the conversion rule is registered in the address converting/filtering part 9 (step B6).

The multicast network unit 1d converts the multicast data delivery from domain (B) (transfer of B=>A: message N6) at the address converting/filtering part 9 and also transmits the multicast data delivery to domain (A) (transfer of B=>A: message N7) (step B7a).

Even when data delivery is stopped by a stop request from domain (A), the multicast network unit 1d refers to the conversion data table 8, if it receives a multicast-address stop request (transfer of B=>A: message N8) from domain (A). And the multicast network unit 1d converts the multicast address in dependence on a conversion rule held in the conversion data table 8 and transmit the stop request containing the converted address ((transfer of B=>A: message N9) to domain (B). At the same time, the conversion rule held in the address converting/filtering part 9 is deleted (step B9a).

Thus, according to the traffic control function of the multicast network unit 1d, traffic congestion can be avoided.

(B) Second Embodiment of the Present Invention

A description will be given in the case where a delivery system in the second embodiment is assigned a single domain and the case where it is assigned a plurality of domains.

The delivery systems 100 and 100a of the first embodiment has a large-scale network of domains 11 to 34 connected and is divided into the domains 11 to 34. Even when networks have a different network system or different addressing system, they can be interconnected, and a multicast network across networks can be constructed.

On the other hand, in a delivery system 100c of FIG. 15 constructed in accordance with a second embodiment of the present invention, domains 11 and 23 are connected through an external network 101, and a multicast network unit 1e can be realized by being applied to this delivery system 100c.

Figure 16:
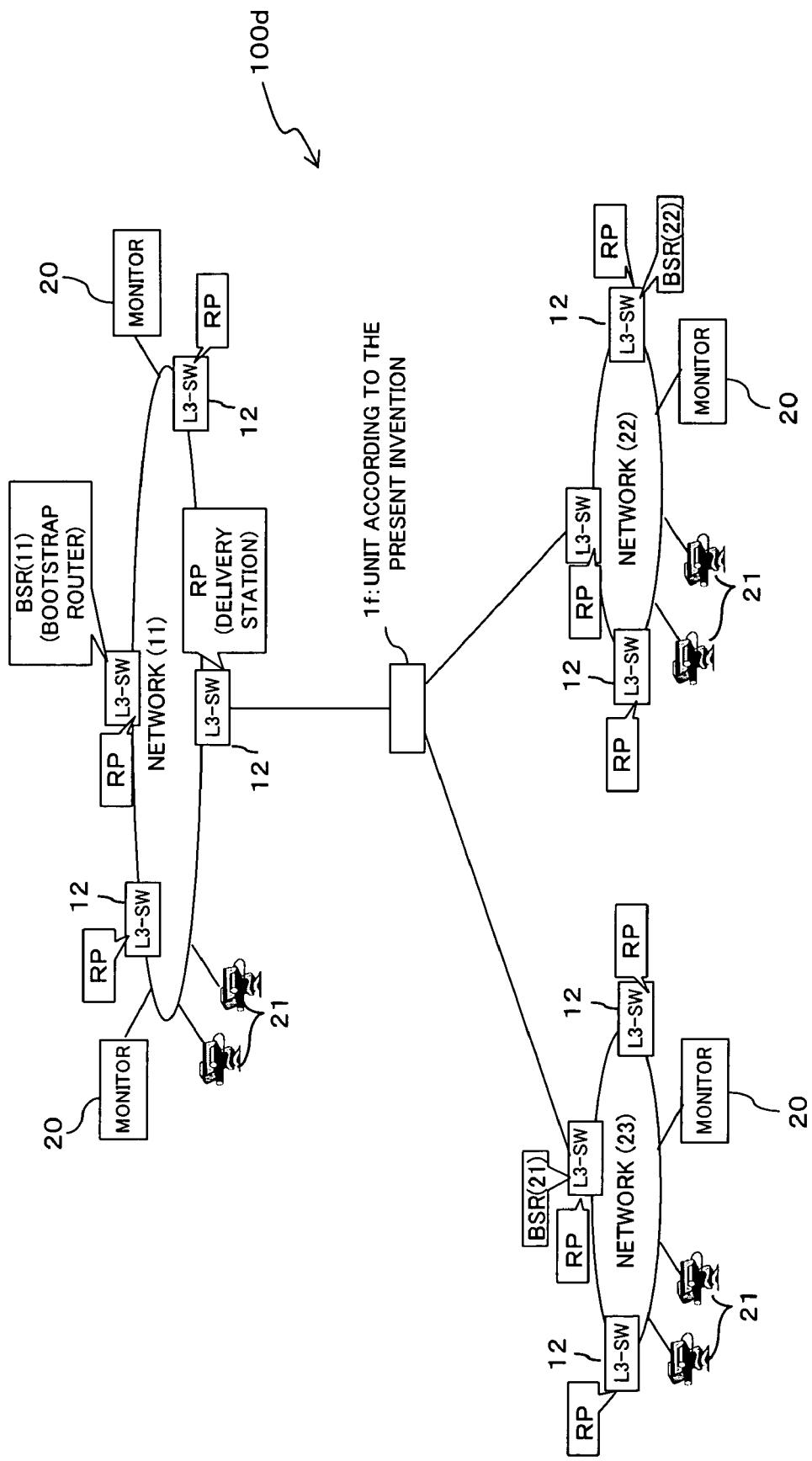
FIG. 16 is a diagram showing another delivery system constructed in accordance with the second embodiment of the present invention.
Figure 17B:
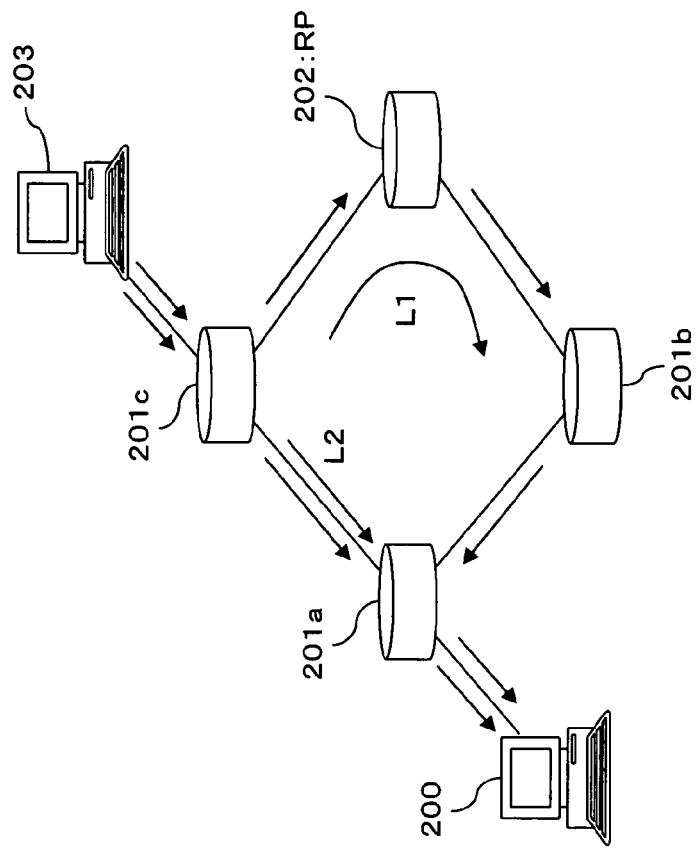
FIGS. 17A and 17B are diagrams used to explain how routing is carried out by PIM-SM.
Figure 17A:
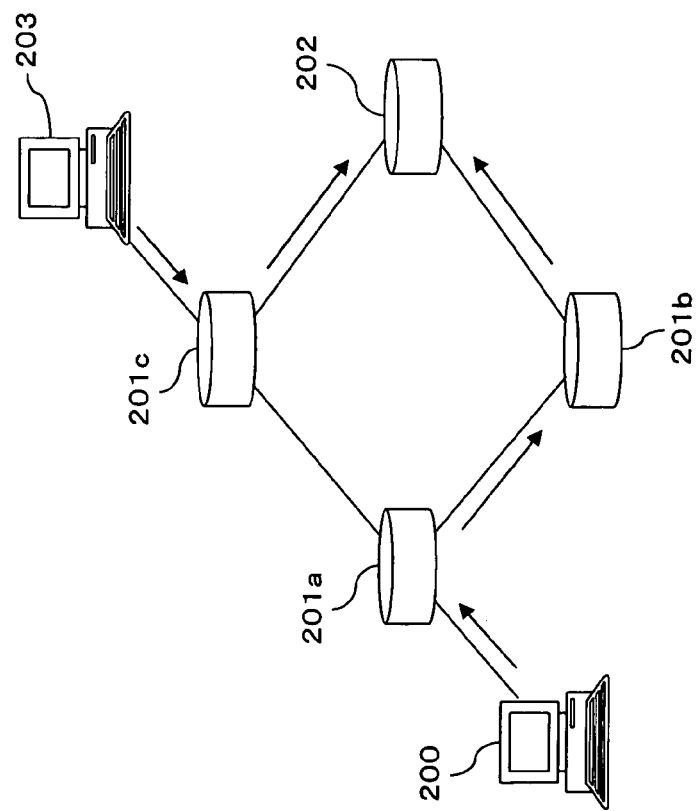
Figure 18:
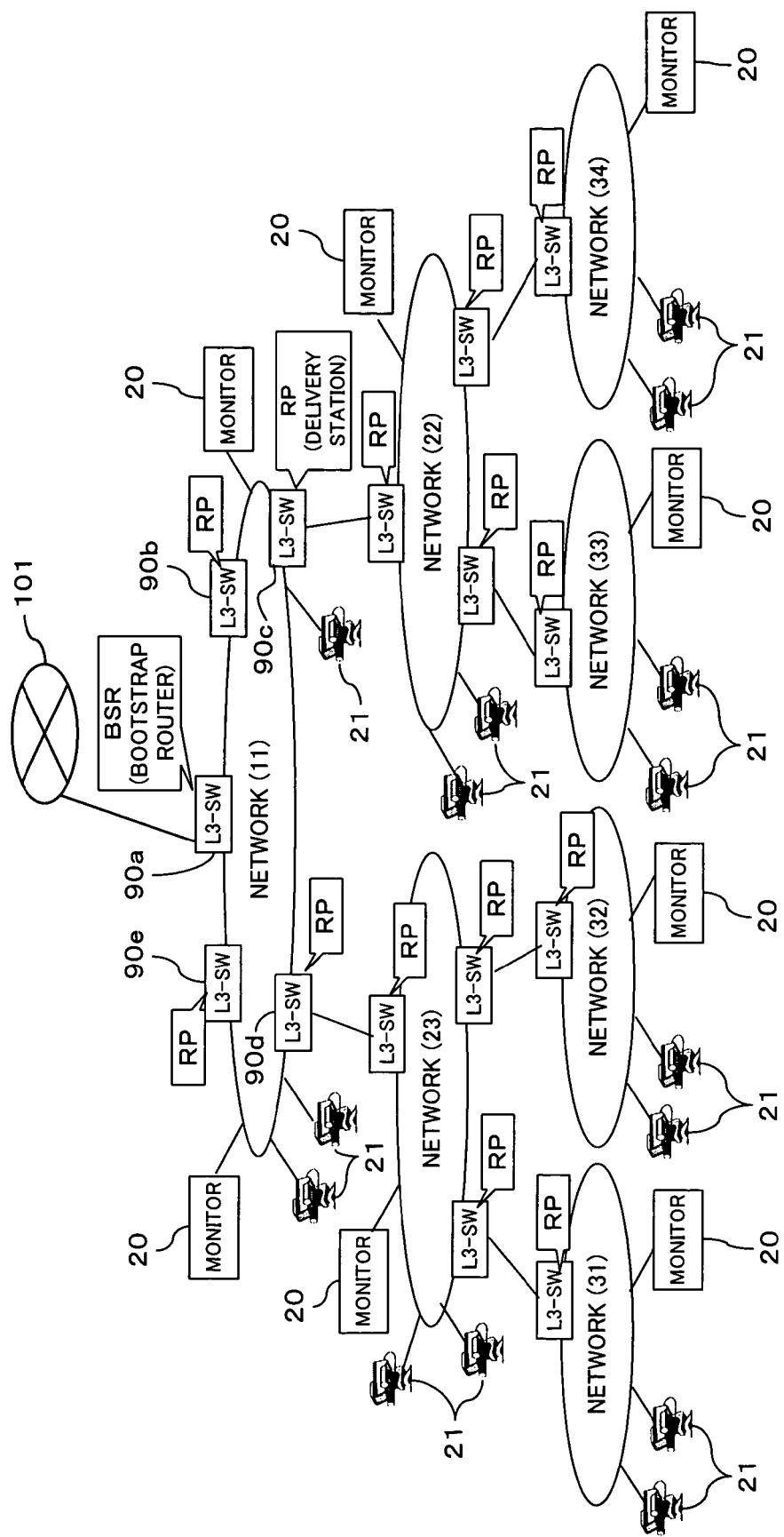
FIG. 18 is a diagram showing the construction of a delivery system employing a single domain.

Furthermore, FIG. 16 shows another delivery system constructed in accordance with the second embodiment of the present invention. A multicast network unit 1f of the delivery system 100d shown in the figure is connected to three different domains 11, 22, and 23. The multicast network unit 1f performs multicast communication between the domains 11, 22, and 23, whereby a plurality of domains can be interconnected.

Thus, according to the delivery system 100d of the present invention, it becomes possible to interconnect a plurality of independent domains. In addition, the prevention of traffic congestion, maintenance of stable data delivery capable of following an enlargement in network scale, and an enhancement in the security of multicast information can be achieved.

(C) Others

While the present invention has been described with reference to the preferred embodiments thereof, the invention is not to be limited to the details given herein, but may be modified within the scope of the invention hereinafter claimed.

For example, a domain can also be assigned to one network node. The delivery systems 100 to 100c are also able to delivery software applications, files for updating software and for batch processing, etc.

The multicast routing protocol for the delivery systems 100 to 100c can employ PIM-SSM (Protocol Independent Multicast-Source Specific Multicast) extended from PIM-SM.

The invention claimed is:

1. A multicast network unit, disposed between a first multicast network domain and a second multicast network domain, for delivering data to the second multicast network domain from the first multicast network domain, comprising:
   an extraction part for extracting first group address information within the first multicast network domain from said data;
   a holder part for holding said first group address information and second address information within the second multicast network domain so that said first group address information and said second address information correspond to each other;
   a judgment part for judging whether said holder part holds said first group address information extracted by said extraction part and outputting the result of a judgment;
   a filtering part which, when said result of judgment is holding, converts said first group address information to said second address information in said holder part corresponding to said first group address information and, when said result of judgment is non-holding, discards said data; and
   a transmitter part for transmitting data containing said second address information converted by said filtering part, to said second multicast network domains,
   wherein said filtering part is constructed so that it converts at least either said first group address information or second address information contained in said received data in dependence on a conversion rule held in said holder part.

2. The multicast network unit as set forth in claim 1, wherein said extraction part is constructed to extract delivery destination group address information representing a delivery destination domain as said first group address information, and said holder part is constructed to hold conversion data that correlates delivery source address information representing a delivery source domain as said second address information with said delivery destination group address information.

3. A multicast network unit, disposed between a delivery source domain and a delivery destination domain, for delivering data to the delivery destination domain from the delivery source domain, comprising:
   an extraction part for extracting delivery destination group address information and delivery source address information from said data;
   a holder part for holding conversion data where said delivery destination group address information and said delivery source address information correspond to each other;
   a judgment part for judging whether said holder part holds said delivery destination group address information extracted by said extraction part and outputting the result of a judgment;
   a filtering part which, when said result of the judgment in said judgment part is holding, converts said delivery source address information to said delivery destination group address information in said holder part corresponding to said delivery source address information and, when said result of judgment is non-holding, discards said data; and
   a transmitter part for transmitting data containing said delivery destination group address information converted by said filtering part, to the delivery destination domain,
   wherein said filtering part is constructed so that it converts at least either said delivery destination group address information or delivery source address information contained in said received data in dependence on a conversion rule held in said holder part.

4. The multicast network unit as set forth in claim 2, wherein said filtering part is constructed so that it converts at least either a multicast address or delivery source address contained in said delivery destination group address information to a multicast address or delivery source address contained in said delivery source address information, respectively.

5. The multicast network unit as set forth in claim 2, wherein said filtering part is constructed so that it converts a multicast address and delivery source address contained in said delivery destination group address information to a specific multicast address and delivery source address, respectively.

6. The multicast network unit as set forth in claim 2, wherein said filtering part is constructed so that it transfers said received data in dependence on a multicast address in said delivery destination group address information that is partially masked.

7. The multicast network unit as set forth in claim 1, wherein said filtering part is constructed so that it disconnects or processes one or more sessions, which are being selected from the present session as acquired delivery traffic and a plurality of communication sessions, in dependence on a priority held in said holder part and assigned to each session.

8. The multicast network unit as set forth in claim 2, wherein said filtering part is constructed so that it converts at least either said delivery destination group address information or delivery source address information contained in said received data, in dependence on a conversion rule held in said holder part.

9. The multicast network unit as set forth in claim 2, wherein said holder part is constructed to hold data transmitting-receiving port identification information and said delivery source address information or delivery destination group address information so that said data transmitting-receiving port identification information corresponds to said delivery source address information or delivery destination group address information.

10. The multicast network unit as set forth in claim 2, further comprising a traffic management part for managing traffic in said delivery source domain or delivery destination domain in dependence on delivery traffic information contained in said received data extracted by said extraction part.

11. The multicast network unit as set forth in claim 10, wherein said traffic management part is constructed so that it controls traffic in dependence on both delivery traffic information contained in a first delivery request and limitation information about said delivery traffic information.

12. The multicast network unit as set forth in claim 11, wherein said traffic management part is constructed so that it disconnects or processes one or more sessions, which are being selected from the present session as acquired delivery traffic and a plurality of communication sessions, in dependence on a priority assigned to each session.

13. The multicast network unit as set forth in claim 1, further comprising a notification part for notifying a sever transmitting said received data of information about processing of said received data in said filtering part.

14. The multicast network unit as set forth in claim 2, wherein said transmitter part is constructed so that it transmits a stream containing information about said result of the judgment.

15. The multicast network unit as set forth in claim 2, further comprising a unicast transfer part for unicasting data between said delivery destination domain and said delivery source domain.

16. A multicast network system for delivering data between a plurality of independent multicast network domains, comprising:
- a multicast network unit, disposed between a delivery source domain of the plurality of independent multicast network domains and a delivery destination domain of the plurality of independent multicast network domains, for delivering said data to the delivery destination domain from the delivery source domain, comprising
- an extraction part for extracting delivery destination group address information within the delivery source domain from said data,
- a holder part for holding conversion data where said delivery destination group address information corresponds to delivery source address information within the delivery source domain,
- a judgment part for judging whether said holder part holds said delivery destination group address information extracted by said extraction part and outputting the result of a judgment,
- a filtering part which, when said result of the judgment in said judgment part is holding, converts said delivery source address information to said delivery destination group address information in said holder part corresponding to said delivery source address information and, when said result of judgment is non-holding, discards said data, and
- a transmitter part for transmitting data containing said delivery destination group address information converted by said filtering part, to the delivery destination domain,
- wherein said filtering part is constructed so that it converts at least either said delivery destination group address or delivery source address information contained in said received data in dependence on a conversion rule held in said holder part.

17. The multicast network system as set forth in claim 16, wherein said multicast network unit is constructed so that it delivers said data between said plurality of independent multicast network domains through an external network.

18. A multicast method, performed by a multicast network unit disposed between a delivery source domain and a delivery destination domain, for delivering data to the delivery destination domain from the delivery source domain, comprising the steps of:
- extracting delivery destination group address information and delivery source address information from said data;
- holding conversion data where said delivery destination group address information and said delivery source address information correspond to each other;
- judging whether said conversion data holds said delivery destination group address information and outputting the result of a judgment;
- when said result of the judgment is holding, converting said delivery source address information to said delivery destination group address information held so as to correspond to said delivery source address information and, when said result of the judgment is non-holding, discarding said data; and
- transmitting data containing said delivery destination group address information, to the delivery destination domains
- wherein said convening includes converting at least either said delivery destination group address information or delivery source address information contained in said received data in dependence on a conversion rule held with said conversion data.

\* \* \* \* \*